(12) United States Patent
Guim Bernat et al.

(10) Patent No.: US 10,944,689 B2
(45) Date of Patent: Mar. 9, 2021

(54) SCALABLE EDGE COMPUTING

(71) Applicant: Intel Corporation, Santa Clara, CA (US)

(72) Inventors: Francesc Guim Bernat, Barcelona (ES); Karthik Kumar, Chandler, AZ (US); Thomas Willhalm, Sandhausen (DE); Mark A. Schmisseur, Phoenix, AZ (US); Timothy Verrall, Pleasant Hill, CA (US)

(73) Assignee: Intel Corporation, Santa Clara, CA (US)

( * ) Notice: Subject to any disclaimer, the term of this patent is extended or adjusted under 35 U.S.C. 154(b) by 135 days.

(21) Appl. No.: 16/024,465

(22) Filed: Jun. 29, 2018

(65) Prior Publication Data

US 2020/0007460 A1    Jan. 2, 2020

(51) Int. Cl.
| | | |
|---|---|---|
| *G06F 15/173* | (2006.01) |
| *H04L 12/919* | (2013.01) |
| *H04L 12/911* | (2013.01) |
| *G06F 9/50* | (2006.01) |
| *G06N 20/00* | (2019.01) |

(52) U.S. Cl.
CPC .......... *H04L 47/765* (2013.01); *G06F 9/5011* (2013.01); *G06N 20/00* (2019.01); *H04L 47/823* (2013.01); *H04L 47/824* (2013.01)

(58) Field of Classification Search
CPC ..... G06F 9/5011; G06N 20/00; H04L 47/765; H04L 47/823; H04L 47/824
USPC ................................ 709/223, 224, 225, 226
See application file for complete search history.

(56) References Cited

U.S. PATENT DOCUMENTS

| | | | |
|---|---|---|---|
| 10,402,733 B1* | 9/2019 | Li ........................... G06N 20/00 |
| 2018/0026905 A1* | 1/2018 | Balle .................. G06F 11/3414 |
| | | | 709/226 |
| 2018/0026910 A1* | 1/2018 | Balle ..................... G06F 3/0647 |
| | | | 709/226 |
| 2018/0027055 A1* | 1/2018 | Balle .................... G02B 6/4452 |
| | | | 709/226 |
| 2018/0027058 A1* | 1/2018 | Balle ..................... G06F 9/3887 |
| | | | 709/226 |
| 2018/0027066 A1* | 1/2018 | Van De Groenendaal .................. |
| | | | G06F 3/0611 |
| | | | 709/226 |
| 2018/0307979 A1* | 10/2018 | Selinger ................. H04N 7/183 |

* cited by examiner

*Primary Examiner* — Liang Che A Wang
(74) *Attorney, Agent, or Firm* — Patent Capital Group

(57) ABSTRACT

There is disclosed in one example a communication apparatus, including: a telemetry interface; a management interface; and an edge gateway configured to: identify diverted traffic, wherein the diverted traffic includes traffic to be serviced by an edge microcloud configured to provide a plurality of services; receive telemetry via the telemetry interface; use the telemetry to anticipate a future per-service demand within the edge microcloud; compute a scale for a resource to meet the future per-service demand; and operate the management interface to instruct the edge microcloud to perform the scale before the future per-service demand occurs.

25 Claims, 14 Drawing Sheets

US 10,944,689 B2

SCALABLE EDGE COMPUTING

FIELD OF THE SPECIFICATION

This disclosure relates in general to the field of mobile computing, and more particularly, though not exclusively, to a system and method for providing scalable edge computing.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
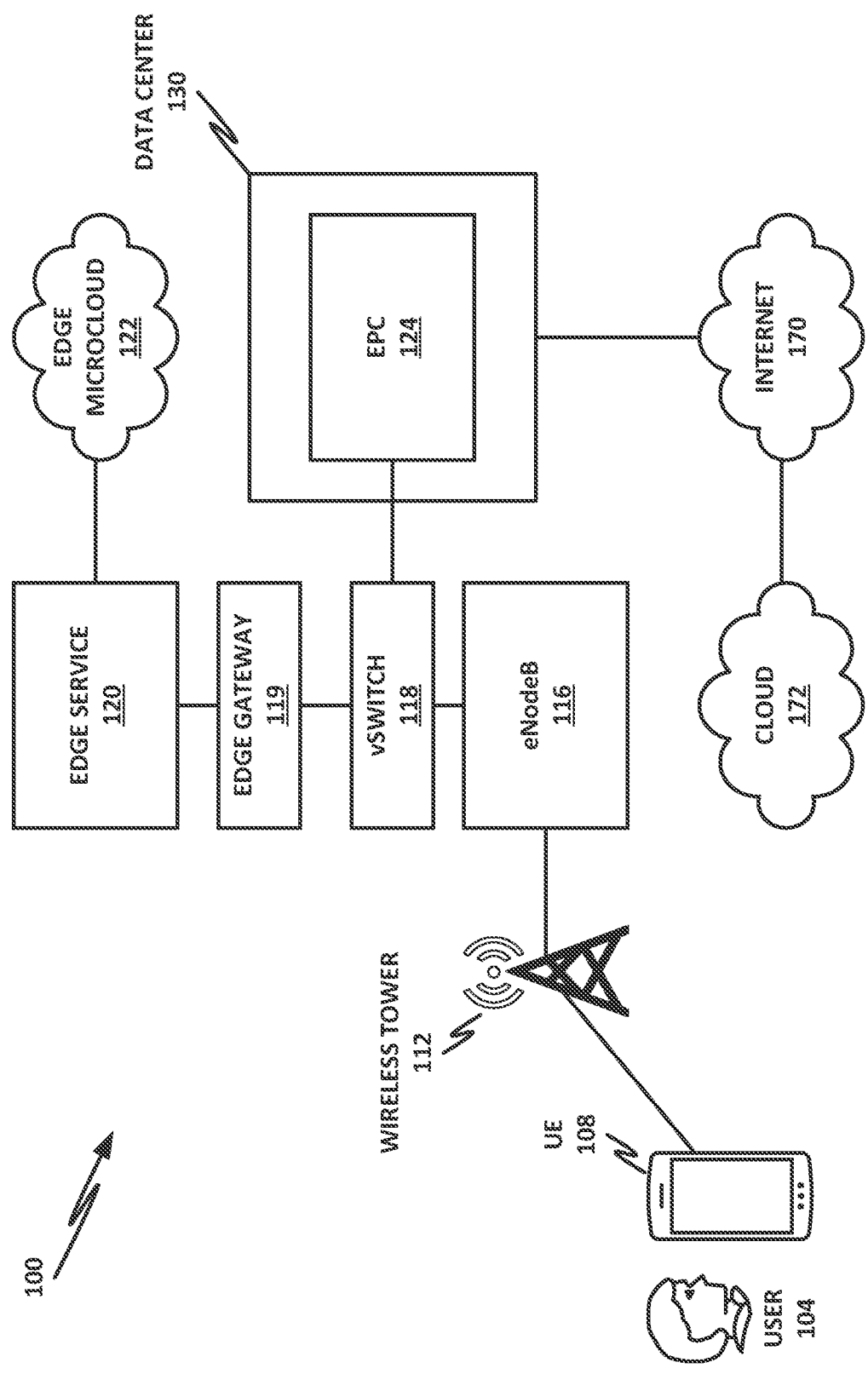
FIG. 1 is a block diagram of a mobile network configured to provide edge computing services, according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A contemporary computing platform, such as a hardware platform provided by Intel® or similar, may include a capability for monitoring device performance and making decisions about resource provisioning. For example, in a large data center such as may be provided by a cloud service provider (CSP), the hardware platform may include rack-mounted servers with compute resources such as processors, memory, storage pools, accelerators, and other similar resources.

For purposes of the present specification, a processor includes any programmable logic device with an instruction set. Processors may be real or virtualized, local or remote, or in any other configuration. A processor may include, by way of nonlimiting example, an Intel® processor (e.g., Xeon®, Core™, Pentium®, Atom®, Celeron®, x86, or others). A processor may also include competing processors, such as AMD (e.g., Kx-series x86 workalikes, or Athlon, Opteron, or Epyc-series Xeon workalikes), ARM processors, or IBM PowerPC and Power ISA processors, to name just a few.

As used herein, "cloud computing" includes network-connected computing resources and technology that enables ubiquitous (often worldwide) access to data, resources, and/or technology. Cloud resources are generally characterized by great flexibility to dynamically assign resources according to current workloads and needs. This can be accomplished, for example, via virtualization, wherein resources such as hardware, storage, and networks are provided to a virtual machine (VM) via a software abstraction layer. A VM is an isolated partition within a computing device that allows usage of an operating system and other applications, independent of other programs on the device in which it is contained. VMs, containers, and similar may be generically referred to as "guest" systems.

Resources may also be assigned, by way of nonlimiting example, via containerization, wherein instances of network functions are provided in "containers" that are separated from one another, but that share underlying operating system, memory, and driver resources.

Edge computing, including mobile edge computing and multi-access edge computing (MEC) is a fast emerging method for providing low latency mobile computing services. Low latency may be particularly important in 4G mobile computing services such as long-term evolution (LTE) in the case of premium subscribers who pay for premium access to certain services. Latency can also be important for law enforcement purposes (e.g., in the case of an AMBER Alert, in which the safety of a child is at issue), for safety applications such as driver assist systems or autonomous vehicles, or in other contexts where latency and bandwidth are at a premium. Furthermore, in emerging 5G standards, users and devices may have an overall expectancy of lower latency for certain services. These expectations may be even stronger in standards and protocols that evolve beyond 5G.

Edge computing can help to alleviate latency for certain latency sensitive applications by providing a virtual switch (vSwitch) or other routing function provided in hardware or software that classifies incoming traffic, and identifies certain incoming traffic as being latency sensitive. In a classic mobile network, functions of the base station and even a second-tier central office may have been provided by an application-specific integrated circuit (ASIC) or other high-speed hardware that was well suited to handle a large volume of inbound traffic quickly, but that lacked a great deal of flexibility. In the emerging edge computing paradigm, these ASICs are replaced by a local "microcloud" or other form of small data center that is more flexible and is able to provide edge computing services. Although the term microcloud has gained contemporary popularity, its use within this specification should not be construed to require a particular size. Rather, the microcloud of the edge computing service may clone some functionality that would otherwise be provided by a service provider in the cloud, possibly within a larger data center. To provide just one nonlimiting example, certain premium subscribers may pay for low latency access to streaming media services such as video services like Netflix, Amazon Video, or Hulu, or audio services such as Pandora, Last.fm, Spotify, and others. When the base station or central office receives an incoming request for access to one of these services, and identifies it as a low latency request (e.g., a request originating from a premium subscriber), rather than send the traffic out to the cloud via its ordinary in-line route, a vSwitch or other routing hardware or software diverts the packet to the local microcloud, which provides some cloned functionality of the larger cloud service. For example, if the premium subscriber is watching a movie on Netflix, the edge computing microcloud may clone portions of the Netflix cloud, and may download a local copy of the streaming video so that the video can be provided to the end user with very low latency.

The computing services provided by the base station or central office are referred to herein as an "edge microcloud." This term provides a useful distinction between service-diverted resources (edge traffic), and those that follow the in-line path to the "cloud." The term recognizes that in current practice, the edge microcloud is generally smaller than a full-scale cloud data center. However, the term "microcloud" should not be construed to require a particular size, or even a relative size difference between the in-line "cloud" and the diverted "microcloud." In various embodiments, an edge microcloud may be of any suitable size, and have any suitable mixture of resources.

One motivation for using edge computing is to provide the ability to handle real-time requirements for edge applications, which include not only streaming media, but also applications such as surveillance, Internet of things (IOT) sensors, autonomous vehicles, automated driver assistance systems (ADAS), and others. In some of these applications, it is critical to be able to respond to the user in real-time or in near real-time. The complexity of providing such services may be compounded by the need to provide multiple streams of work, each with varying loads, in real-time or near real-time. Thus, the edge computing microcloud may need to provide a mapping of these streams of work to physical pooled resources, including, for example, compute resources (e.g., central processing units), memory, and storage pools.

Among the computing systems capable of providing such dynamic resource application is the Intel® rack scale design (RSD) or other species of pooled design or software defined infrastructure (SDI), in which compute resources can be provided at the full rack level, with certain line replaceable units (LRUs) provided as resource sleds that are hot-swappable within the computing rack. While an Intel® RSD rack may externally conform to the physical dimensions of a 42 U computing rack, the RSD rack advantageously need not be bound by the "unit" paradigm of traditional rack computing. Rather, a rack can be configured internally with device sizes and interfaces that are customized and optimized for certain computing applications. Such a rack may include a chassis for compute sleds, accelerator sleds, memory sleds (including next-generation memories such as Intel® 3D Crosspoint (3DXP)), and networking equipment, by way of nonlimiting example. RSD-based data centers may also employ Intel® silicon photonics technologies, which integrates semiconductor laser technology with silicon integrated circuits.

An example of an RSD solution is the Ericsson Hyperscale Data Center (HDS) 8000. The Facebook Open Compute Project is a competing standard, and implementations are available from vendors such as Edgecore, Circle B, Hyve Solutions, Hewlett Packard Enterprise, Penguin Computing, Radisys, Cumulus Networks, Inspur, Wiwynn, QCT, and ColorChip by way of nonlimiting example. Some data center architectures that employ the teachings of this specification may rely on technologies available from the OpenPOWER Foundation, which provides for customization of IBM POWER processors. Embodiments may also incorporate teachings from the Telecom Infra Project (TIP), which focuses on optical broadband networks and cellular networks.

The available resources in a computing rack can be allocated according to the principles of SDI, in which a computing device need not be a single physical device, but rather is defined as a dynamically allocated composite node, in which case one or more compute resources such as processors are allocated to the composite node, along with an appropriate amount of memory, storage, accelerators, and other resources. As the workload demands on a system (including an edge computing microcloud) change, composite nodes can be dynamically reallocated to meet the new resource demands.

However, traditional methods of reactively allocating compute resources according to resource demands that have already changed may result in failure to meet service level agreements (SLAs) while resources are being reallocated. This may result in a breach of contract on the part of the telecommunications provider (TELCO), or even a breach of legal or other obligations.

Thus, embodiments of the present specification advantageously provide novel interfaces and configurations of computing equipment so that an appropriate device (such as an edge router, which in some cases may be embedded within an iNIC) can proactively provide and receive telemetry so that computing resources can be reallocated prospectively to meet anticipated changes in resource demands. This can include upscaling and/or downscaling resources such as compute resources, memory resources, storage resources, and accelerator resources.

For example, consider a case in which an application stream is directed to a virtual network function (VNF) with an incoming stream of images and a required response time of 20 milliseconds. This could be, for example, a situation in which an autonomous vehicle is processing inputs, and requires a response time of 20 milliseconds or less to safely operate the vehicle. Assume that the stream of images has 1 TB of memory assigned to it from a shared memory pool, and the remainder of the shared memory pool is allocated to other VNFs. Some of those other VNFs may have lower priority.

Assume now that the rate at which incoming images are streamed has doubled. For example, a number of previously idle cameras may have been activated in response to an AMBER Alert. Using the previously allocated 1 TB of memory, the latency may be nearly double that of the previous latency. This latency may fail to meet a contractual or legal obligation for response time. Once the change in the data stream has been detected, additional resources may be allocated to the VNF—for example, an additional terabyte of memory may be allocated to the VNF to handle the increased data rate. But in the interim, while the change is being made, SLAs are not being met. Thus, this reactive paradigm may be insufficient to meet the needs of contemporary computing practice.

However, if appropriate devices within the network, including base stations, sensors, and other data providers are enabled to mutually provide telemetry to one another, then the edge computing microcloud could detect the activation of the new cameras as soon the activation command is sent. For example, the activation command may go out through the network, and when it is received at an appropriate network node, that node may operate a telemetry interface to notify the appropriate microcloud that additional cameras are being activated. An appropriate entity, such as an orchestrator, may then determine that an additional terabyte of memory should be allocated to the VNF to handle the anticipated increase in data that may come from the newly activated cameras. This enables compute resources in the edge microcloud to receive a "heads up" from data sources (such as sensors or cameras) about an expected increase in VNF payload, thus enabling the edge microcloud to proactively allocate resources by, for example, scaling up capacity before the new workload hits. This ensures that SLAs continue to be met once the workload increases. Furthermore, base stations may share with one another (on a peer-to-peer (P2P) telemetry interface) information about changing workloads, and may also share information with a central office, which may include an orchestrator that can orchestrate changes in workloads among various base stations.

For example, consider the case where a user is traveling along an interstate highway (as a passenger, obviously) while watching a video on Netflix. If this user is a premium subscriber who has paid for a low latency access to Netflix, then it is beneficial for the service provider to continue to provide low latency video. For example, the user may be watching the Netflix original series "Stranger Things," and as the user travels along the interstate, the user equipment hops from base station to base station. As the user's route is anticipated, telemetry data provided on P2P telemetry interfaces between base stations, and also provided to the central office, may be used to anticipate which base station the user is going to hit next, and to preload a copy of the current episode of "Stranger Things" onto the edge microcloud of that base station. Furthermore, because it is well-known that nobody watches a single episode of "Stranger Things" at a time, as the user nears the end of a current episode, an upcoming base station may also preemptively load a copy of the next episode of "Stranger Things," so that the user can enjoy an uninterrupted viewing experience.

Embodiments of the present specification include providing improved intelligence on small cell stations, base stations, and at the central office.

At the small cell level, these devices may move around different base stations and around a given territory. Small cells may be configured to provide telemetry, including specific information to the gateway of the current base station regarding what is being consumed on that small cell. The small cell may provide telemetry, and may also in some cases provide a request to increase or decrease the amount of storage or memory currently allocated to the device or tenant. Telemetry may include information about the current storage and input/output (I/O) activity happening at the small cell, which may be translated into short or midterm future I/O and storage activity predictions for the base station. The telemetry may also include historical information about how the small cell has been storing data when connected to a previous base station, including, for example, bandwidth, type of storage, storage requirements, and others. The small cell may also provide hints coming from a connected user equipment (UE) device or application on upcoming future needs that can be serviced by the currently connected base station, which the base station can use to store a given amount of data with certain requirements (e.g., the type of storage, quality of service (QoS), SLAs, or similar).

The base station may include logic for predicting or anticipating, and proactively allocating edge computing microcloud resources according to telemetry received. The base station may also include a P2P telemetry interface that it may use to share with its peer base station the activity of each of the devices currently connected to it, or that have been connected to it during a certain configurable period of time. This can include information regarding I/O and storage requirements, memory and compute capacity, and similar. Base station gateways may use the P2P historical information, along with the likelihood that a particular device may jump to that base station next, or that it is currently jumping to that base station, to dynamically allocate or prepare storage, I/O, and other compute resources to meet demand. The base station may have accelerator resources or other resources that use a neural network (NN) or similar algorithms. These resources may directly attach to storage forms (such as pooled or local), and the base station may use the appropriate algorithm to learn and predict or anticipate how tenants use or require resources on the edge microcloud. The base station may then dynamically manage and configure storage and other resources according to its predictions.

A central office may provide orchestration at the system level to determine how telemetry and data flows are passed between different base stations. This may be based, for example, on the previous and/or projected trajectory of UE devices. For example, the central office may anticipate that device D is likely to jump to base station (BS) 4, because it has previously linearly jumped from BS 1 to BS 2 to BS 3. Thus, the central office may reroute telemetry and historical I/O and storage data from BS 1 to BS 2 to BS 3 to BS 4 before device D actually connects to BS 4. This enables BS 4 to dynamically configure its edge microcloud to meet the anticipated demand of device D. Similarly, the central office may store historical information from the base stations and route these data to other base stations as required.

Embodiments of the system of the present specification take advantage of the fact that memory and storage requirements for many services and VNFs hosted on the edge can be proactively derived based on the amount of traffic that edge devices are sending to the edge. For example, if edge devices are sending 10 Gb per second of data through the edge gateway to an augmented reality (AR) service (the service being executed in platform A and using x amount of pooled memory or storage) and the level of traffic is increasing by 1%, the edge gateway may usefully anticipate that the resource allocation should be increased by 1%, and continue to be increased by 1%, until the demand stops increasing. Similarly, this same method could be applied when traffic for the AR service is decreasing.

Embodiments of the present specification include an edge gateway, which may be embedded inside an iNIC. The edge gateway may include logic that uses telemetry from the fabric to identify how much bandwidth is actually being delivered to a particular VNF or service.

Each VNF or service hosted in the edge microcloud has a function (which may be, for example, a bitstream or x86 application) that may use the aforementioned telemetry to estimate the level of resources that may be required by the VNF or service in the future. The edge gateway may include logic that can perform this prediction. In some cases, the logic is provided not on the edge gateway itself, but rather the edge gateway provides an interface to an accelerator or a node controller, where tenants can register each of these functions, and the actual calculations can be performed in an accelerated fashion.

The edge gateway may also include logic that analyzes historical data of utilization per each service or VNF to estimate how much memory and storage may be needed in the short term future. This can be based on a heuristic or a hysteresis model, in which past loads can be used to anticipate future demands.

In some cases, telemetry and predictions may be based on temporal periodic predictions. For example, certain services may see daily, weekly, monthly, yearly, or other periodic increases in demand that center around outside stimuli. In one nonlimiting embodiment, a video streaming service may experience relatively low demand during the day when many users are at work or at school, but may experience daily peaks between 8 and 11 PM. Services could see regularly occurring peaks that also center around other events such as holidays, weekends, special events, scheduled update releases for software, or similar. The logic for predicting or anticipating future events may be based on a simple regression model, complex machine learning (ML) models, or other models including simple average values. The predictive logic of the edge gateway may use any of these functions to determine how much memory, storage, and other resources may be required to scale-up or scale-down to anticipated workloads. Note that in some embodiments, scale-down may require software interactions with the VNF or service part.

A system and method for providing scalable edge computing will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of a mobile network 100 configured to provide edge computing services, according to one or more examples of the present specification.

Embodiments of mobile network 100 disclosed herein may be configured for use in edge computing contexts. The terms "edge computing," "mobile edge computing" (MEC) and "multi-access edge computing" (also MEC) are used by various actors in the art. These terms are sometimes used interchangeably, and other times distinctions are drawn. Originally, "edge computing" referred to edge computing that occurred within a TELCO's central office (CO), while (mobile) MEC referred to edge computing services provided at or near the base station (e.g., an eNodeB in LTE). Later, some actors within the MEC space felt that "mobile" did not adequately capture the full range of services, and the term evolved to "multi-access" MEC. Except where a clear distinction is clearly and deliberately drawn, the term "edge computing" as used throughout this specification and the appended claims encompasses any species of edge computing, and the term MEC refers to the later evolution of the term (multi-access edge computing). In cases where it is clear, in context, that an example or embodiment refers specifically to a single species of edge computing, the term refers to that species of edge computing only in the context of that example or embodiment.

In the context of FIG. 1 and the description that follows, MEC within an eNodeB is used as an illustrative and nonlimiting example of edge computing. It will be evident to those with skill in the art that the teachings of FIG. 1 can be adapted to other species of edge computing with appropriate modifications.

In the example of FIG. 1, a user 104 operating user equipment (UE) 108 communicates with mobile network 100. Specifically, UE 108 may be equipped with a wireless transceiver that can communicate with a wireless tower 112. Wireless tower 112 is then communicatively coupled to a base station, such as an eNodeB 116.

In the present embodiment, eNodeB 116 is an example of a base station used in a 4G LTE network. In other examples, other base stations may be used, such as a 3G NodeB, or a 5G or later base station. A vSwitch 118 services eNodeB 116, and may be configured to switch packets to an evolved packet core (EPC) 124. EPC 124 may be located in a data center 130, and may couple mobile network 100 to the Internet 170, or to any other network. Note that an EPC is provided in this embodiment as an illustrative example, but the teachings of this specification are not so limited. The EPC is specific to LTE networks, and other networks may provide the same or similar functionality in a different packet core or other subsystem. The EPC may also be referred to as a system architecture evolution (SAE) core. In 5G networks, the EPC (or equivalent function) may be virtualized, and as networks evolve, it is anticipated that terminology may also evolve with it. Thus, the designation of an EPC in this specification is intended to broadly encompass an LTE EPC, any previous version of the packet core, and any future generation network unit that replaces the EPC.

In this example, eNodeB 116 also includes an edge service 120. Edge service 120 provides a service or workload function that may be located at or near eNodeB 116, and which may provide a high bandwidth and/or low latency connection to user 104. For example, user 104 may be a premium subscriber to services of mobile network 100, and may be contractually provided with higher throughput. Edge service 120 could be by way of illustration a streaming video service, in which case it is advantageous to locate edge service 120 physically closer to eNodeB 116 (i.e., in terms of physical distance), and logically closer to eNodeB 116 (i.e., in terms of number of hops from eNodeB 116). Note that an eNodeB is provided in this embodiment as an illustrative example, but the teachings of this specification are not so limited. The eNodeB is specific to LTE networks, and other networks may provide the same or similar functionality in a different packet core or other subsystem. In 5G networks, the eNodeB (or equivalent function) may be virtualized, and as networks evolve, it is anticipated that terminology may also evolve with it. Thus, the designation of an eNodeB in this specification is intended to broadly encompass an LTE eNodeB, any previous version of the NodeB, and any future generation network unit that replaces the eNodeB.

However, it should be noted that not all traffic provided by edge service 120 should be routed to edge service 120. For example, other nonpremium subscribers may be accessing mobile network 100, in which case their traffic may be routed to EPC 124, or out to Internet 170, where it may be handled in a cloud data center (e.g., by a data center operated by the service provider). Thus, when vSwitch 118 receives an incoming packet, the packet may take one of two paths. The packet may be directed to EPC 124 via an "in-line" path, or may be "diverted" to edge service 120. The determination of whether to direct the incoming packet in-line to EPC 124 or to divert the packet to edge service 100 may depend on a number of factors, including properties of the packet itself, such as subscriber information, or other information such as the loading on various network elements.

Edge gateway 119 provides gateway services to edge service 120. The gateway services may include routing of traffic, as well as providing both reactive and predictive adjustments to allocation of resources within edge microcloud 122 to respond to changing demands in workload.

Edge microcloud 122 may be configured to provide a clone of selected services ordinarily provided within cloud 172. Cloud 172 may represent one or more large data centers with greater resource availability. Edge microcloud 122, on the other hand, may have relatively fewer compute resources than cloud 172, and may thus be required to frequently dynamically allocate resources to respond to current workflow demands. In some cases, edge microcloud 122 handles only diverted traffic that is identified for low latency servicing, such as for premium subscribers or for other time sensitive data processing.

Figure 2A:
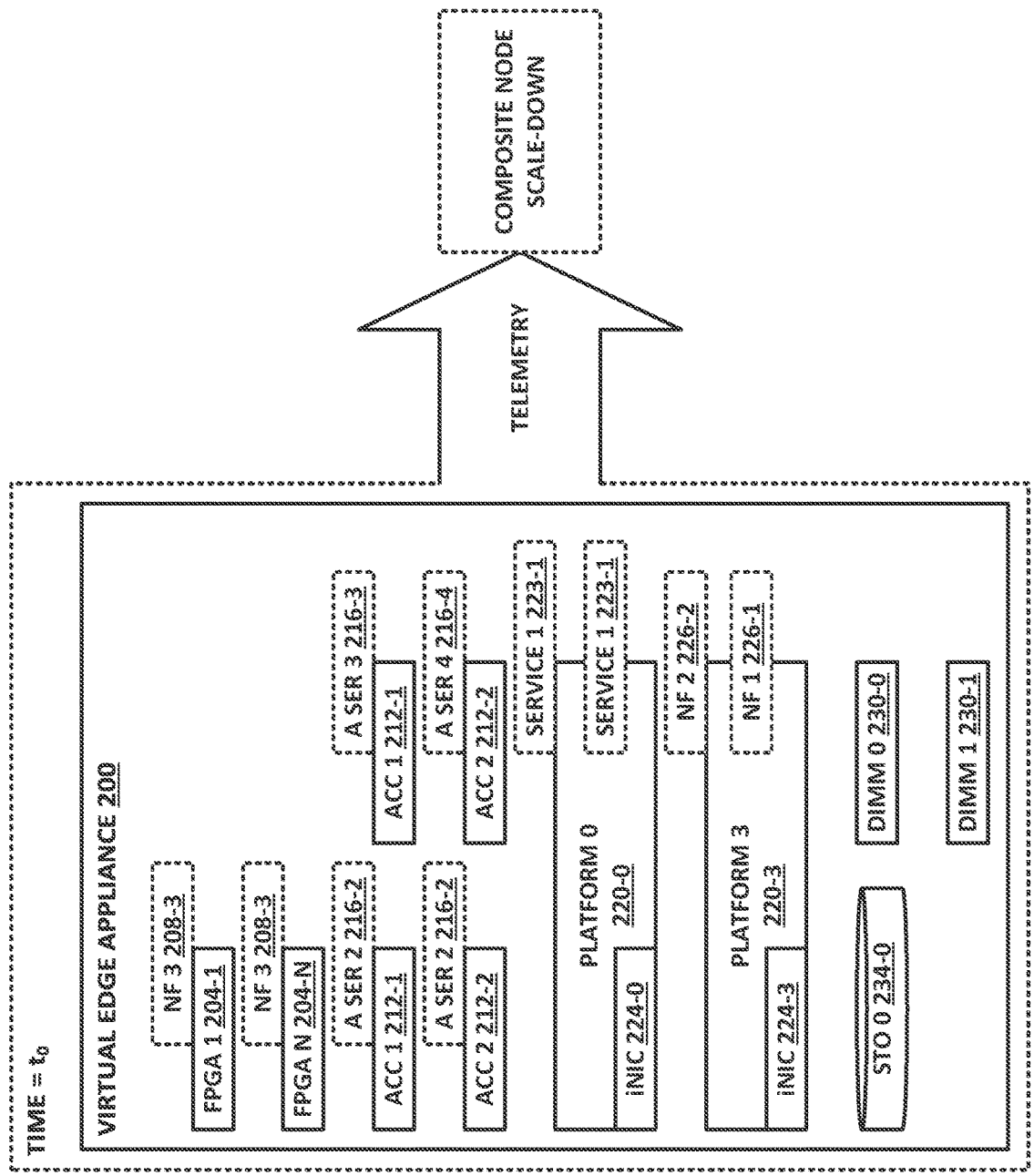
FIGS. 2a, 2b, and 2c are block diagrams illustrating dynamic scalability of an edge computing platform, according to one or more examples of the present specification.
Figure 2B:
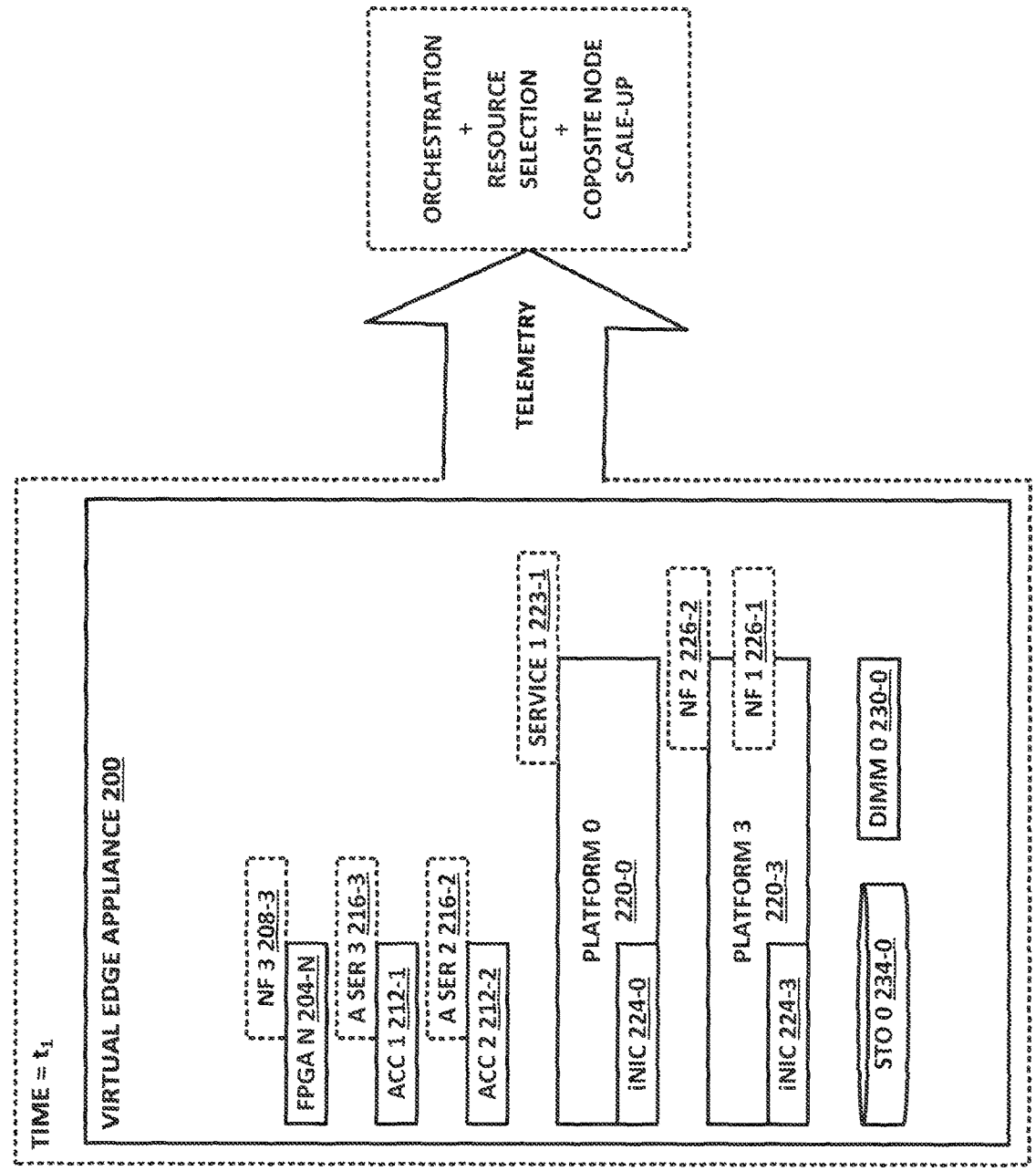
Figure 2C:
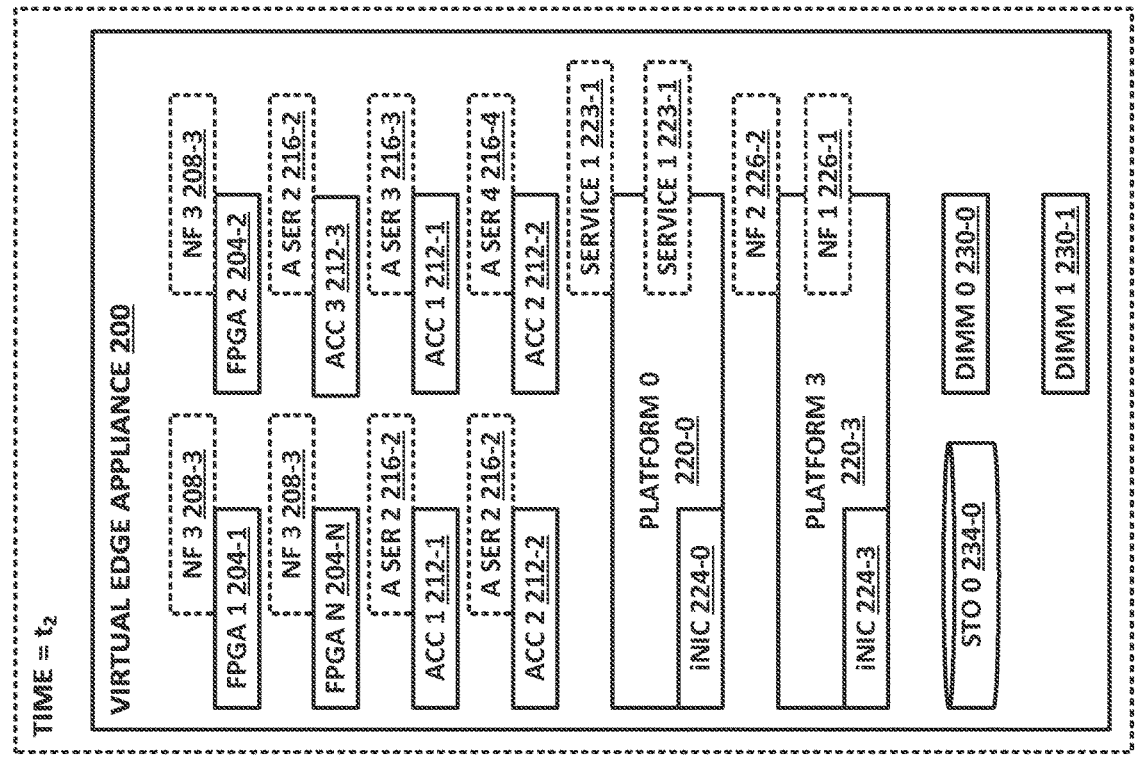

FIGS. 2a, 2b, and 2c are block diagrams illustrating dynamic scalability of an edge computing platform, according to one or more examples of the present specification.

FIGS. 2a, 2b, and 2c illustrate at an abstract level how the scheme of the present specification may appear over time in a particular embodiment. Turning to FIG. 2a, a virtual edge appliance 200 is provided. Virtual edge appliance 200 may have allocated to it field-programmable gate array (FPGA) 1 204-1 through FPGA N 204-N, which may be allocated to network function (NF) 3 208-3, which may be a "bare metal" virtual function, a virtual network function (VNF), or any equivalent thereof. Virtual edge appliance 200 also includes accelerator 1 212-1, and accelerator 2 212-2. Accelerator 1 212-1 may be shared by accelerated service 2 216-2 and accelerated service 3 216-3. Accelerator 2 212-2 also provides a portion of accelerated service 2 216-2, as well as providing accelerated service 4 216-4.

Virtual edge appliance 200 includes platform 0 220-0, which has iNIC 224-0, and which is configured to provide two instances of service 1 223-1. Virtual edge appliance 200 also includes platform 3 220-3, which includes iNIC 224-3, and which provides NF 1 226-1, and NF 2 226-2.

Virtual edge appliance 200 has allocated to it storage 0 234-0, as well as memory banks dual in-line memory module (DIMM) 0 230-0 and DIMM 1 230-1. At TIME=$t_0$, virtual edge appliance 200 may encounter inputs that cause it to provide telemetry, which may drive a composite node scale-down action.

Turning to FIG. 2b, after the composite node's scale-down action, the workload has decreased from medium to low. Because the workload is now low, fewer resources are required. Note that the telemetry provided in FIG. 2a may be used to proactively determine that the decrease in workload from medium to low is going to happen, and to provide the scale-down such that virtual edge appliance 200 is not oversubscribed when the workload change occurs.

In the example of FIG. 2b, platform 0 220-0 now provides only one instance of service 1 223-1. Also, only one memory bank, namely DIMM 0 230-0, is now allocated to virtual edge appliance 200. Furthermore, two accelerators have been deallocated, so that now virtual edge appliance 200 has only one instance each of accelerator 1 212-1 and accelerator 2 212-3. Virtual edge appliance 200 no longer provides accelerated service 4 216-4, and instead now provides one instance each of accelerated service 2 216-2 and accelerated service 3 216-3. FPGA N 204-N is still allocated to virtual edge appliance 200, and now provides NF 3 208-3.

At TIME=$t_1$, virtual edge appliance 200 provides telemetry. This may result in actions such as orchestration, resource selection, and composite node scale-up. For example, telemetry may indicate that the workload on virtual edge appliance 200 is going to increase from a low demand to a high demand, which may be even higher than the previous medium demand of FIG. 2a.

Turning to FIG. 2c, at TIME=$t_2$, virtual edge appliance is experiencing high demand. Because the high demand was anticipated, virtual edge appliance 200 was dynamically configured to meet the demand before a loss of SLAs, for example. In this case, FPGA 1 204-1 provides NF 3 208-3, FPGA 2 204-2 provides a second instance of NF 3 208-3, and FPGA N 204-N provides a third instance of NF 3 208-3. Two instances each of accelerator 1 212-1 and accelerator 2 212-2 have been allocated, along with one instance of accelerator 3 212-3. These accelerators provide three instances of accelerated service 2 216-3, one instance of accelerated service 3 216-3, and one instance of accelerated service 4 216-4.

Platform 0 220-0 now provides two instances of service 1 223-1, while platform 3 220-3 now provides one instance of NF 1 226-1 and one instance of NF 2 226-3.

In response to the increase in demand, DIMM 0 230-0 and DIMM 1 230-1 are now both allocated to FIG. 2c. Furthermore, whereas in FIG. 2a only a portion of each DIMM may have been allocated to virtual edge appliance 200, responsive to, anticipative of, or predictive of the higher demand in FIG. 2c, more of the memory in each bank, up to and including all of the available memory of each bank, may have been allocated to virtual edge appliance 200. Furthermore, responsive to the changing storage demands, more or less of the available storage of storage 0 234-0 may be allocated to virtual edge appliance 200.

Figure 3:
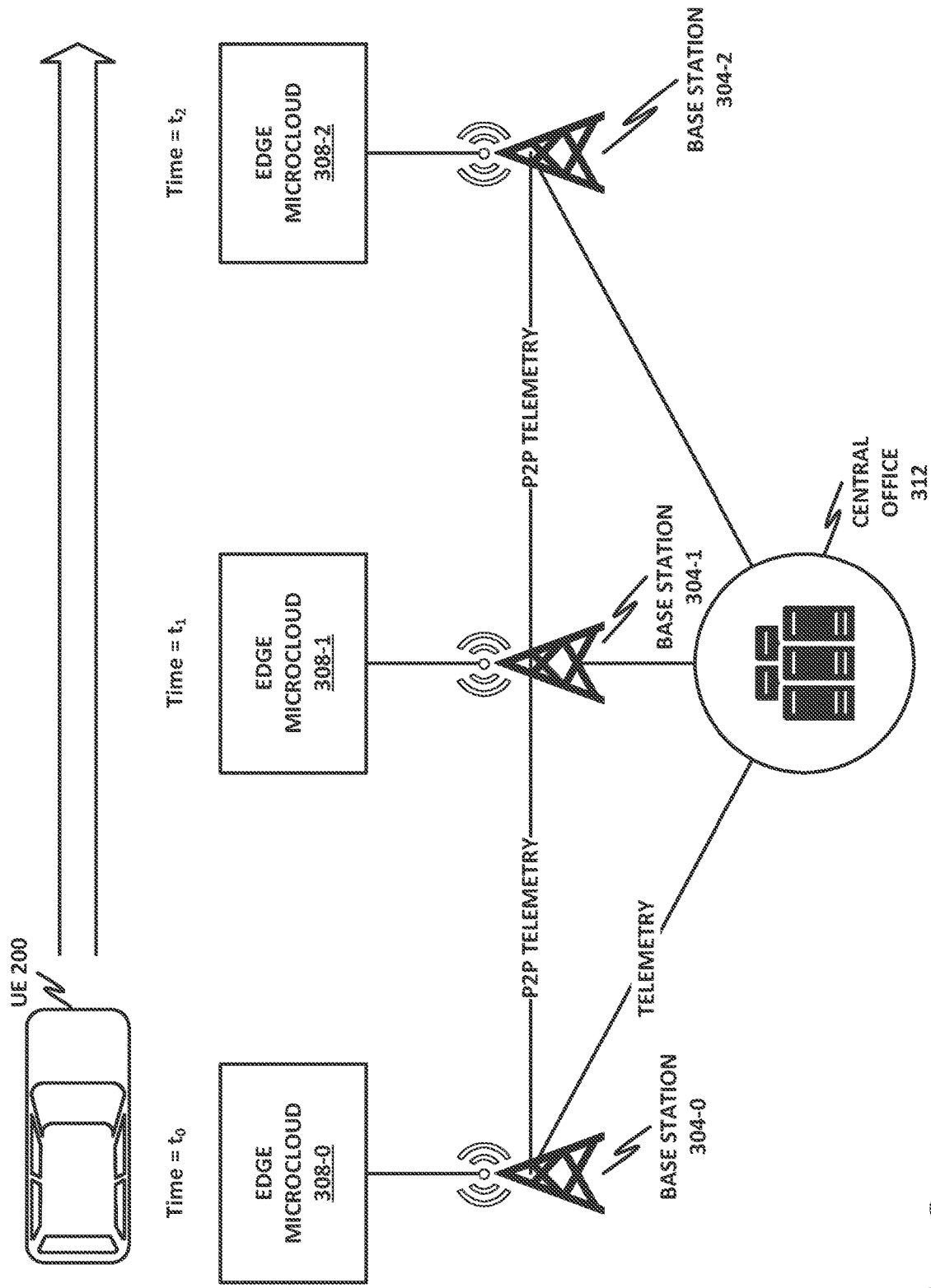
FIG. 3 is a block diagram of a mobile network including a plurality of base stations configured to provide edge computing, according to one or more examples of the present specification.

FIG. 3 is a block diagram of a mobile network including a plurality of base stations configured to provide edge computing, according to one or more examples of the present specification.

In the example of FIG. 3, there is an illustration that workload demands may change not only temporally as in FIGS. 2a through 2c, but also spatially. For example, UE 200 may be traveling along a path that takes it from base station 304-0 at TIME=$T_0$ to base station 304-1 at TIME=$t_1$ to base station 304-2 at TIME=$t_2$. Each base station 304 may provide its own edge microcloud 308, namely, base station 304-0 provides edge microcloud 308-0, base station 304-1 provides edge microcloud 308-1, and base station 304-2 provides edge microcloud 308-2. Each base station 304 may be configured to provide telemetry to central office 312. Central office 312 may use the telemetry from base stations 304 to orchestrate provision of resources within the appropriate edge microcloud 308 for each base station. Furthermore, base stations 304 may mutually provide to one another P2P telemetry, which each base station 304 may also use to autonomously provide predictive resource reallocation within its respective edge microcloud 308.

In one embodiment, telemetry may include user equipment mobility indicia, or in other words, indicators that a mobile UE device is moving, which may include the probability for one or more base stations to be the next base station the UE will reach.

The combination of telemetry to central office 312, instructions and directives from central office 312, and P2P telemetry to and from other base stations enables each base station 304 to proactively make decisions about what resources may be required in the near future, and to allocate resources in a manner to meet increased or decreased demand as those demands change. Advantageously, the telemetry interfaces of the present specification enable edge microclouds 308 to be configured before the changes in demand actually occur, which enables edge microclouds 308 to make changes before, for example, SLAs are missed.

Figure 4:
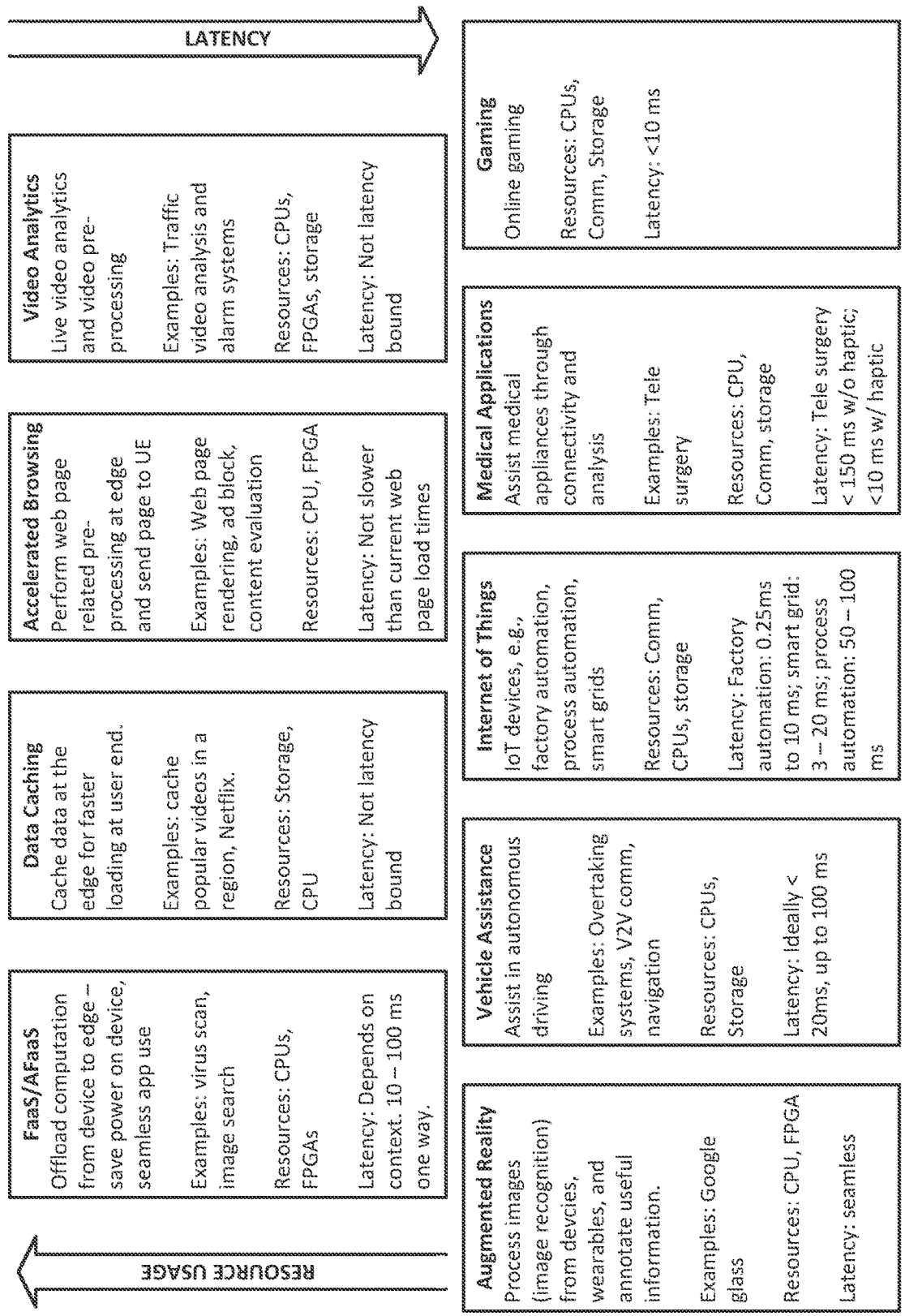
FIG. 4 is a block diagram illustrating the relationship between resource usage and latency for certain edge computing services, according to one or more examples of the present specification.

FIG. 4 is a block diagram illustrating the relationship between resource usage and latency for certain edge computing services, according to one or more examples of the present specification.

FIG. 4 illustrates that some types of services have higher resource usage and require lower latency, while other services have lower resource usage and/or require lower latency.

Examples of services that may require higher resource usage, but that are tolerant of higher latency, include function as a service (FaaS) or accelerated function as a service (AFaaS), data caching, accelerated browsing, and video analytics, by way of nonlimiting example.

FaaS/AFaaS may be used to offload computations from devices to the edge. This can save power on the device, and also provide seamless application usage. Examples include virus scans and image searches. Resources that may be allocated for an FaaS or AFaaS implementation include, by way of nonlimiting example, FPGAs and central processing units (CPUs). Latency for these applications depends on the context, but may in some cases be in the range of 10 to 100 milliseconds each way.

Data caching provides a cache of certain data at the edge for faster loading for the end user. One example embodiment includes a cache of popular videos in a region for streaming audio or video services such as those discussed above. Resources for data caching include storage and CPUs, by way of nonlimiting example. While these are intended to provide overall lower latency for the end user, they are not necessarily latency bound. Rather, they may simply be designed to be better than a remote data cache.

Accelerated browsing services may perform web-related preprocessing at the edge and send pages to the UE. Examples include webpage rendering, ad block, and content evaluation. Resources that may be used in accelerated browsing include, by way of nonlimiting example, CPUs and FPGAs. As with data caching, there is no specific latency target, although it is intended that accelerated browsing should not be slower than current webpage load times.

Video analytics may include, for example, live video analytics and video preprocessing. Example use cases include traffic video analysis and alarm systems. Resources used in this may include, by way of nonlimiting example, CPUs, FPGAs, and storage. As before, the service is not necessarily latency bound, although it is desirable to minimize latency as much as is practical.

Examples of applications that may have relatively lower resource usage requirements, but that may have low latency requirements, include augmented reality, vehicle assistance, Internet of things, medical applications, and gaming.

Augmented reality may process images, for example, for purposes of image recognition. The images may be received from UE devices, wearables, and other devices. The augmented reality system can then annotate useful information and augment a display with the annotated information. An example includes Google Glass, or other similar products. Resources allocated for augmented reality include, by way of nonlimiting example, CPUs and FPGAs. These can have very low latency requirements, enabling a seamless user experience.

Vehicle assistance systems assist in autonomous driving, or in an ADAS. Examples include overtaking systems, vehicle-to-vehicle (VTV) communication, navigation, and many other systems that may be used in autonomous, semiautonomous, or driver assistance systems. Resources allocated for a vehicle assistance system include, by way of nonlimiting example, CPUs and storage. The ideal latency for the vehicle assistance system is less than 20 milliseconds, although in some cases latency of up to 100 milliseconds is acceptable.

In the Internet of things, IOT devices may connect to the network, including factory automation, process automation, and smart grids, by way of nonlimiting example. Resources allocated for IOT services include, by way of nonlimiting example, communication, CPUs, and storage. The tolerable latency may vary according to the application. For example, for factory automation, the latency may be between 0.25 milliseconds up to 10 milliseconds. For a smart grid, the latency may be between three and 20 milliseconds. For process automation, the latency may be between five and 100 milliseconds.

Medical applications may include devices that assist medical appliances through connectivity and analysis. This can be used, for example, in telesurgery. Resources allocated for medical applications include, by way of nonlimiting example, CPUs, communication, and storage. Tolerable latency depends on whether haptic feedback is provided. For telesurgery without haptic feedback, latency of up to 150 milliseconds may be acceptable. For telesurgery with haptic feedback, latency may need to be less than 10 milliseconds.

Gaming systems may include online gaming. Resources allocated for online gaming may include, by way of nonlimiting example, CPUs, communication, and storage. The tolerable latency should be less than a human-perceptible time, for example less than 10 milliseconds for common applications.

One restriction in the edge microcloud may include the limited availability of certain resources at each edge tier. In the case of an edge microcloud at a base station or central office, the amount of storage, memory, and compute operators may be far more limited than what would be available in a traditional "macro cloud" data center. It is therefore advantageous to provide mechanisms for real-time provision and release of resources to particular VNFs or edge services. This can allow multiple workloads, such as those depicted in FIG. 4, to share the same infrastructure, despite their different resource and latency requirements. Furthermore, having a more fine-grained and adaptive solution may substantially reduce total cost of ownership (TCO). The system of the present specification addresses the issue of how to efficiently use and scale edge microcloud resources, while accounting for QoS, SLAs, and other factors, as applied to multiple services. To achieve this, tight integration may be provided between resources such as iNICs, pooled memory, and accelerated memory technologies.

Figure 5:
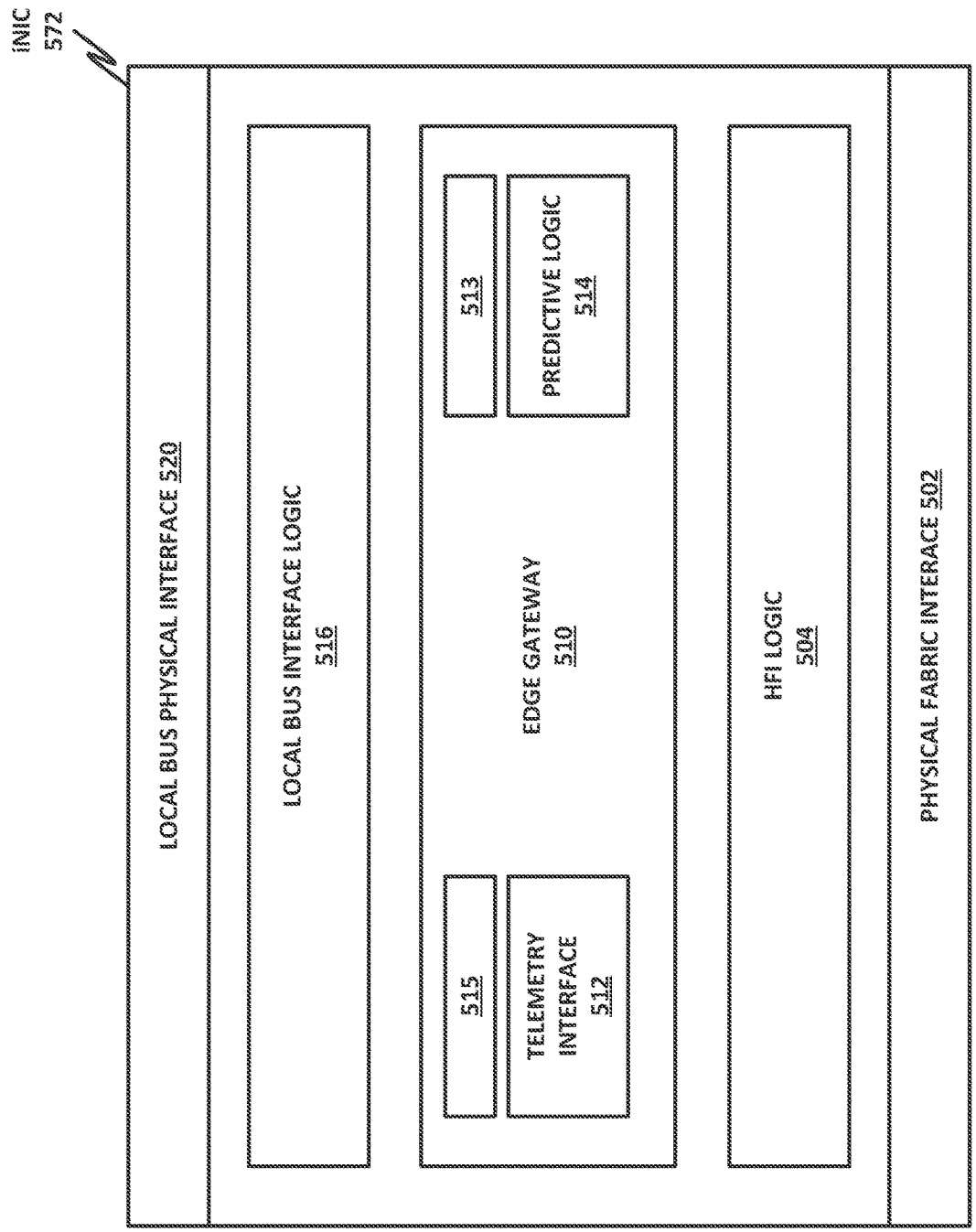
FIG. 5 is a block diagram of an intelligent network interface card (iNIC), according to one or more examples of the present specification.

FIG. 5 is a block diagram of an intelligent network interface card (iNIC) 572, according to one or more examples of the present specification.

This iNIC 572 is provided by way of nonlimiting example only. It should be noted in particular that iNIC 572 may be a separate pluggable card, such as a PCIe card, or it may be tightly integrated and on-die with its host core. Furthermore, while iNIC 572 is disclosed herein as the medium for hosting remote hardware acceleration functions, these functions could just as well be hosted in another part of the machine. For example, a dedicated RHA chip could be provided, which itself could be very much like a hardware accelerator. Functions could be performed on a hardware block integrated into the core, or these functions could be performed in software on the core. Thus, the disclosure of remote hardware acceleration functions on iNIC 572 in this figure should be understood as a nonlimiting and illustrative example only, and the present disclosure should be understood to encompass any suitable hardware or software configuration for realizing remote hardware acceleration.

In this example, iNIC 572 includes two physical interfaces, namely a local bus physical interface 520 and a physical fabric interface 502.

Local bus interface 520 may provide a physical interface to a local bus on the host, such as a PCIe interface or other local interconnect. Local bus physical interface 520 is provided as a nonlimiting example, and it should be understood that other interconnect methods are possible. For example, in cases where iNIC 572 is tightly coupled with its accompanying core, local bus physical interface 520 could be direct, on-die trace lines, or direct copper connections on an integrated circuit board. In other examples, a bus interface other than PCIe could be used.

Physical fabric interface 502 provides the physical interconnect to any of the fabrics disclosed herein. Physical fabric interface 502 may be configured to connect iNIC 572 to any suitable fabric.

In one particular example, an Ethernet fabric may be used. Some advanced versions of an Ethernet fabric allow mapping of addresses and memory ranges between different coherent domains. Other interconnects may also be used, such as Intel® silicon photonics, an Intel® Host Fabric Interface (HFI), a network interface card (NIC), intelligent NIC (iNIC), smart NIC, a host channel adapter (HCA) or other host interface, PCI, PCIe, a core-to-core Ultra Path Interconnect (UPI) (formerly called QPI or KTI), Infinity Fabric, Intel® Omni-Path™ Architecture (OPA), TrueScale™, FibreChannel, Ethernet, FibreChannel over Ethernet (FCoE), InfiniBand, a legacy interconnect such as a local area network (LAN), a token ring network, a synchronous optical network (SONET), an asynchronous transfer mode (ATM) network, a wireless network such as Wi-Fi or Bluetooth, a "plain old telephone system" (POTS) interconnect or similar, a multi-drop bus, a mesh interconnect, a point-to-point interconnect, a serial interconnect, a parallel bus, a coherent (e.g., cache coherent) bus, a layered protocol architecture, a differential bus, or a Gunning transceiver logic (GTL) bus.

A system may include one or more coherent domains wherein all coherent domains are connected to each other via a fabric. Cache coherency is a memory architecture that provides uniform sharing and mapping between a plurality of caches. For example, the caches may map to the same address space. If two different caches have cached the same address in the shared address space, a coherency agent provides logic (hardware and/or software) to ensure the compatibility and uniformity of shared resource. For example, if two caches have cached the same address, when the value stored in that address is updated in one cache, the coherency agent ensures that the change is propagated to the other cache. Coherency may be maintained, for example, via "snooping," wherein each cache monitors the address lines of each other cache, and detects updates. Cache coherency may also be maintained via a directory-based system, in which shared data are placed in a shared directory that maintains coherency. Some distributed shared memory architectures may also provide coherency, for example by emulating the foregoing mechanisms.

Coherency may be either "snoopy" or directory-based. In snoopy protocols, coherency may be maintained via write-invalidate, wherein a first cache that snoops a write to the same address in a second cache invalidates its own copy. This forces a read from memory if a program tries to read the value from the first cache. Alternatively, in write-update, a first cache snoops a write to a second cache, and a cache controller (which may include a coherency agent) copies the data out and updates the copy in the first cache.

By way of nonlimiting example, current cache coherency models include MSI (modified, shared, invalid), MESI (modified, exclusive, shared, invalid), MOSI (modified, owned, shared, invalid), MOESI (modified, owned, exclusive, shared, invalid), MERSI (modified, exclusive, read-only or recent, shared, invalid), MESIF (modified, exclusive, shared, invalid, forward), write-once, Synapse, Berkeley, Firefly, and Dragon protocols. Furthermore, advanced reduced instruction set computer (RISC) machine (ARM) processors may use advanced microcontroller bus architecture (AMBA), including AMBA 4 ACE, to provide cache coherency in systems-on-a-chip (SoCs) or elsewhere.

Caching agents are the coherency agents within a node that process memory requests from cores within the same node, thus providing the coherency of the domain. Home agents are node clusters that are responsible for processing memory requests from the caching agents, and act as a home for part of the memory address space. A single die may have multiple homes, having a distributed address space mapping. Depending on the address space that the request targets, the request may go to the same node's local memory or they may go to a UPI agent, for example, to route the request to other processors within the same coherent domain. Alternately, a request may go through the iNIC 572 to processors that are outside the coherent domain. All processors connected via the UPI belong to the same coherent domain. Thus, in one embodiment, iNIC 572 may communicate with an Ethernet fabric via UPI tunneling.

This communication may be facilitated via HFI logic 504, which provides logic elements and instructions necessary to provide communication within a coherent domain, and across the fabric with different coherent domains. HFI logic 504 may also include logic to translate local requests into remote fabric requests.

On the other hand, local bus interface logic 516 may provide logic for interfacing with the local bus, such as a PCIe bus, or a dedicated copper connection. Alternately, traffic through iNIC 572 may follow a path through local bus physical interface 520, local bus interface logic 516, HFI logic 504, and physical fabric interface 502 out to the fabric.

Edge gateway 510 may include a telemetry interface 512 that allows edge gateway 510 to send and/or receive telemetry data. As described throughout this specification, this could be peer-to-peer telemetry data, telemetry received from sensors or other downstream sources, or instructions and/or telemetry received upstream, such as from a central office.

Edge gateway 510 may also include predictive logic 514, which uses telemetry data from telemetry interface 512 to anticipate future workload demands on system resources. After predicting or anticipating future resource demands, edge gateway 510 may operate appropriate interfaces, such as local bus interface logic 516, to send instructions that allocate, deallocate, or otherwise adapt resource allocations to the predicted future workload demand.

Note that telemetry interface 512 may use telemetry from the fabric to identify how much bandwidth is actually being delivered to a particular VNF or service. In some embodiments, edge gateway 510 includes a management interface 513 that allows the system software stack to specify how each VNF in service running on the edge microcloud is to be monitored. Each VNF or service may have a set of telemetry data that needs to be collected via telemetry interface 512. This may include, by way of nonlimiting example, a universally unique identifier (UUID) of the metric to be collected (e.g., in-fabric traffic, out-fabric traffic, etcetera). Each telemetry parameter may also include a designation for how often the data should be collected, which may be specified in cycle times, nanoseconds, microseconds, or milliseconds, by way of nonlimiting example. Telemetry interface 512 is responsible for collecting the corresponding platform telemetry and storing it in a local structure that can be accessed by predictive logic 514. Note that telemetry interface 512 may be advantageously configured to collect telemetry data per VNF or service granularity.

Predictive logic 514 may be configured to use historical data of utilization per each service or VNF to estimate how much memory and storage may be needed in the short term. As described above, this may be embodied in a simple regression model, complex ML models, simple average values, or some other algorithm. This logic may use the aforementioned functions to determine how much memory and storage is needed, and may determine how much scale-up or scale-down may be required to meet those demands in the near future. Note that in some examples, scale-down may require software interaction with the network function virtualization (NFV) or part providing the service.

Finally, registration interface 515 allows VNFs or other services or functions to register with edge gateway 510.

Figure 6:
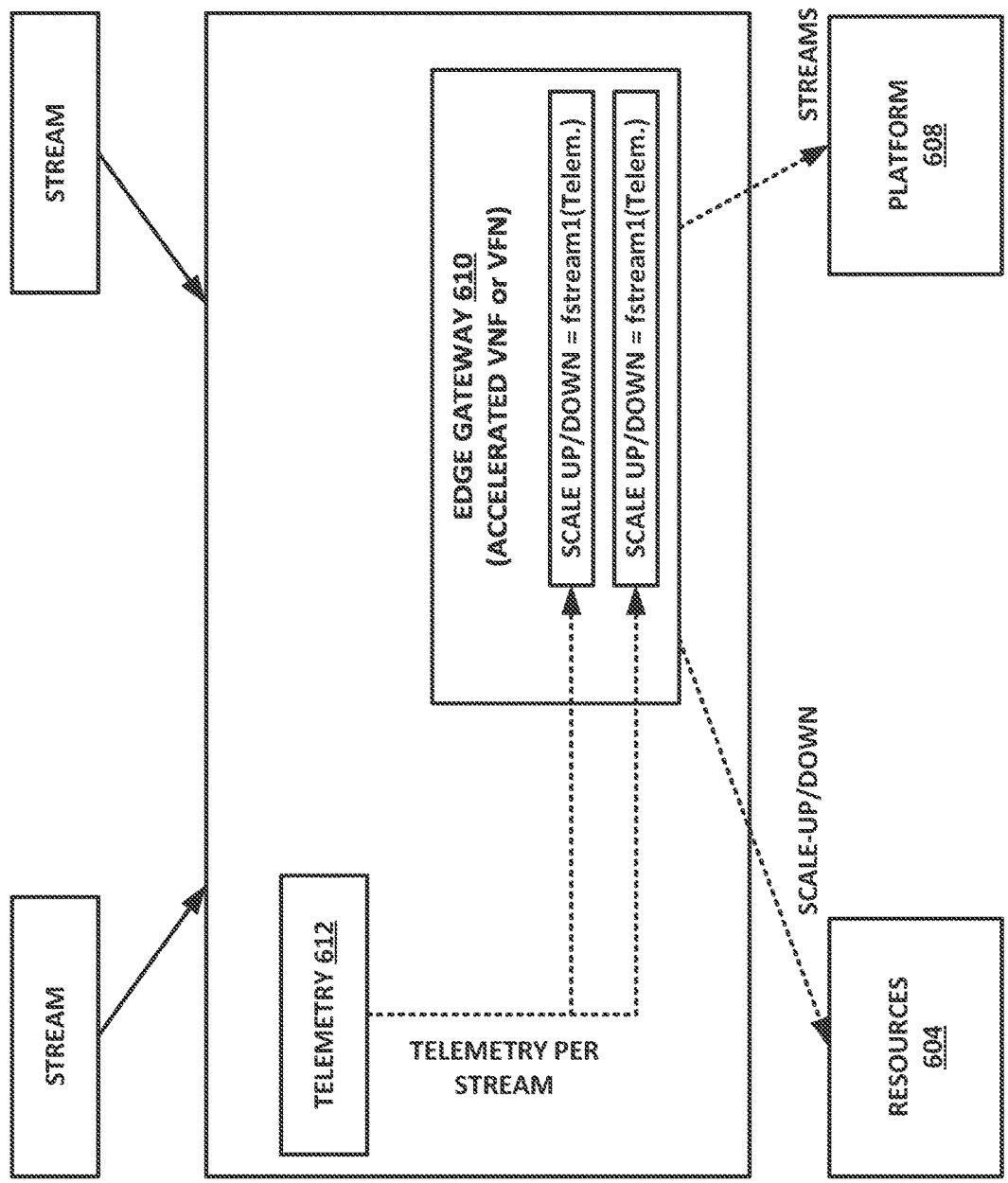
FIG. 6 is a block diagram of an edge gateway, according to one or more examples of the present specification.

FIG. 6 is a block diagram of an edge gateway 610, according to one or more examples of the present specification.

The block diagram of FIG. 6 illustrates how edge gateway 572 of FIG. 5 interacts with the system as a whole.

In the example of FIG. 6, edge gateway 610 is illustrated as a separate block. This may be an edge gateway such as edge gateway 510 integrated into iNIC 572 as illustrated in FIG. 5. However, it should be noted that edge gateway 610 could also be provided as a separate logic element, including software that runs on a microprocessor, an ASIC, a field-programmable gate array, an accelerator, an SoC, an intellectual property (IP) block, or any combination of these or other hardware or software logic elements that are configured to perform the functions of an edge gateway as described herein.

In this example, data streams provide telemetry 612, which may include telemetry per-stream. Telemetry 612 is fed to edge gateway 610, and edge gateway 610 provides scale-up or scale-down decisions which may be a function of the incoming telemetry stream, as illustrated. Scale-up or scale-down instructions may be provided to resources 604, while data streams may be provided to platform 608.

Note that each service or VNF hosted in the edge microcloud may have an identified function, which may be a bitstream or x86 application. The service may use telemetry to estimate how much pooled memory or storage is needed by that VNF or service. Edge gateway 610 includes logic in which tenants may register their various functions. That logic may include the following elements, by way of nonlimiting example:

a. Edge gateway 610 may include a registration interface that allows services to register and deregister their functions. The function may expose a set of predefined application programming interfaces (APIs) that may be called by edge gateway 610 to estimate the memory and storage requirements. Note that in some embodiments, this may be implemented in multiple functions. For example, one function may estimate memory usage, another may estimate storage, another may estimate compute resources, another may estimate accelerators, and so forth. The registration interface allows the function to specify how often it needs to be executed, for example, in terms of milliseconds, microseconds, nanoseconds, or other time.

b. The predictive logic of edge gateway 610 may be responsible for accessing telemetry data from the telemetry interface and executing the necessary computations for each service to estimate the resource demands needed in the next timeframe. When resources need to be scaled up or scaled down, the predictive logic element of edge gateway 610 may generate a software interrupt or other communication mechanism to the VNF or service to inform the VNF or service of the change in scale. This may be particularly helpful in cases where memory or other resources are scaled down. This allows the software stack to permit or deny the reduction, thus avoiding operating errors within the software stack. Edge gateway 610 may then connect, for example, to a POD manager to provide instructions for how much resources are to be scaled up or scaled down. In some embodiments, thresholds may be added that allow upper and lower limits on how much resources can be increased or reduced. Finally, edge gateway 610 may generate a software interrupt or other preferred communication mechanism to the VNF or service whose resources are being scaled up or down, which enables the VNF to reconfigure itself or otherwise adapt to the change in available resources.

Figure 7:
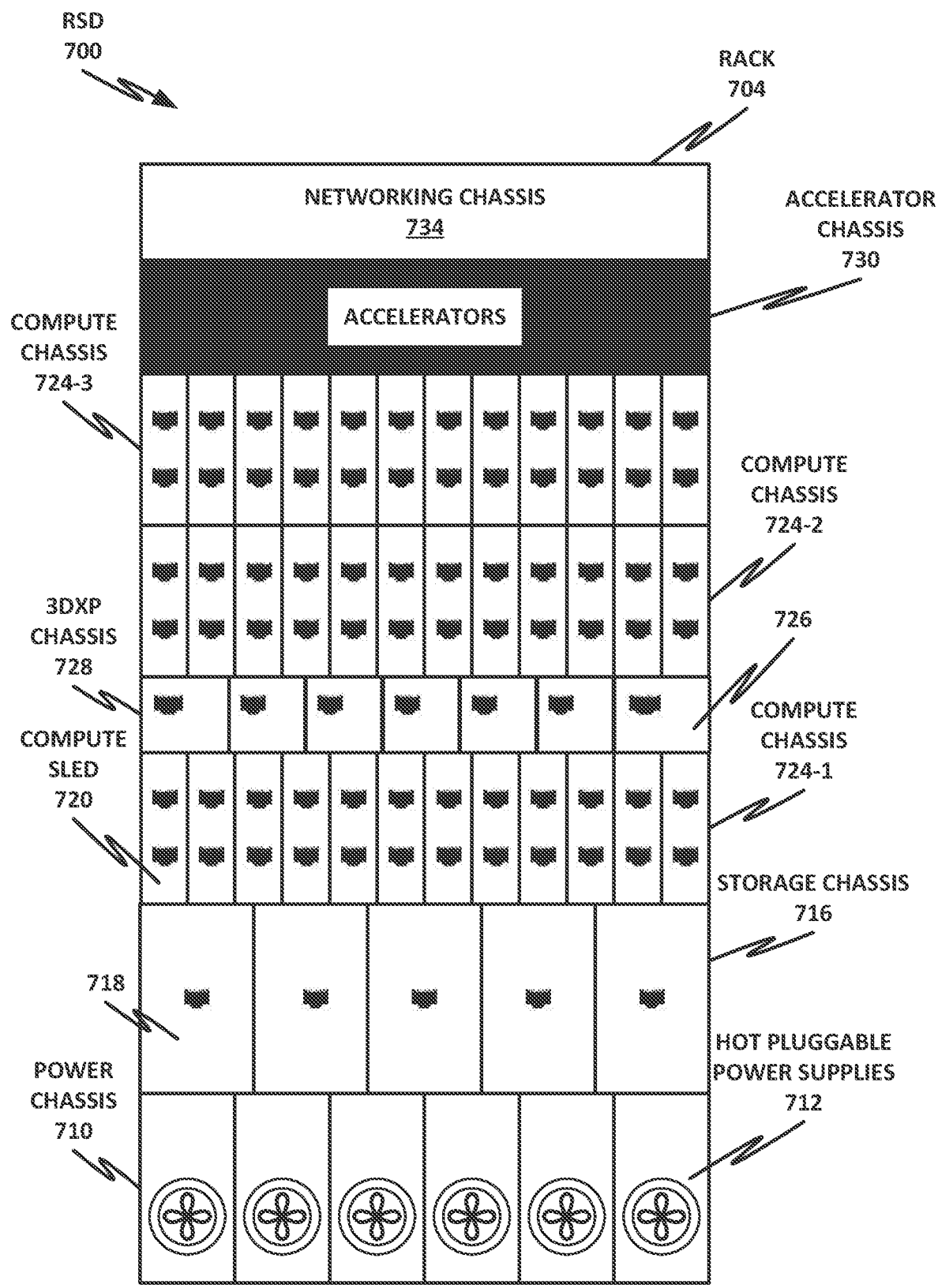
FIG. 7 is a block diagram of a rack scale design (RSD), according to one or more examples of the present specification.

FIG. 7 is a block diagram of a rack scale design (RSD) 700, according to one or more examples of the present specification. Embodiments of RSD 700 disclosed herein may be adapted or configured to provide the method of scalable edge computing according to the teachings of the present specification.

In this example, RSD 700 includes a single rack 704, to illustrate certain principles of RSD. It should be understood that RSD 700 may include many such racks, and that the racks need not be identical to one another. In some cases a multipurpose rack such as rack 704 may be provided, while in other examples, single-purpose racks may be provided. For example, rack 704 may be considered a highly inclusive rack that includes resources that may be used to allocate a large number of composite nodes. On the other hand, other examples could include a rack dedicated solely to compute sleds, storage sleds, memory sleds, and other resource types, which together can be integrated into composite nodes. Thus, rack 704 of FIG. 7 should be understood to be a nonlimiting example of a rack that may be used in an RSD 700.

In the example of FIG. 7, rack 704 may be a standard rack with an external width of approximately 23.6 inches and a height of 78.74 inches. In common usage, this is referred to as a "42 U rack." However, rack 704 need not conform to the "rack unit" standard. Rather, rack 704 may include a number of chassis that are optimized for their purposes.

Rack 704 may be marketed and sold as a monolithic unit, with a number of LRUs within each chassis. The LRUs in this case may be sleds, and thus can be easily swapped out when a replacement needs to be made.

In this example, rack 704 includes a power chassis 710, a storage chassis 716, three compute chassis (724-1, 724-2, and 724-3), a 3-D Crosspoint™ (3DXP) chassis 728, an accelerator chassis 730, and a networking chassis 734. Each chassis may include one or more LRU sleds holding the appropriate resources. For example, power chassis 710 includes a number of hot pluggable power supplies 712, which may provide shared power to rack 704. In other embodiments, some sled chassis may also include their own power supplies, depending on the needs of the embodiment.

Storage chassis 716 includes a number of storage sleds 718. Compute chassis 724 each contain a number of compute sleds 720. 3DXP chassis 728 may include a number of 3DXP sleds 726, each hosting a 3DXP memory server. And accelerator chassis 730 may host a number of accelerators, such as Intel® Quick Assist™ technology (QAT), FPGAs, ASICs, or other accelerators of the same or different types. Accelerators within accelerator chassis 730 may be the same type or of different types according to the needs of a particular embodiment.

Over time, the various LRUs within rack 704 may become damaged, outdated, or may experience functional errors. As this happens, LRUs may be pulled and replaced with compatible LRUs, thus allowing the rack to continue full-scale operation.

Figure 8:
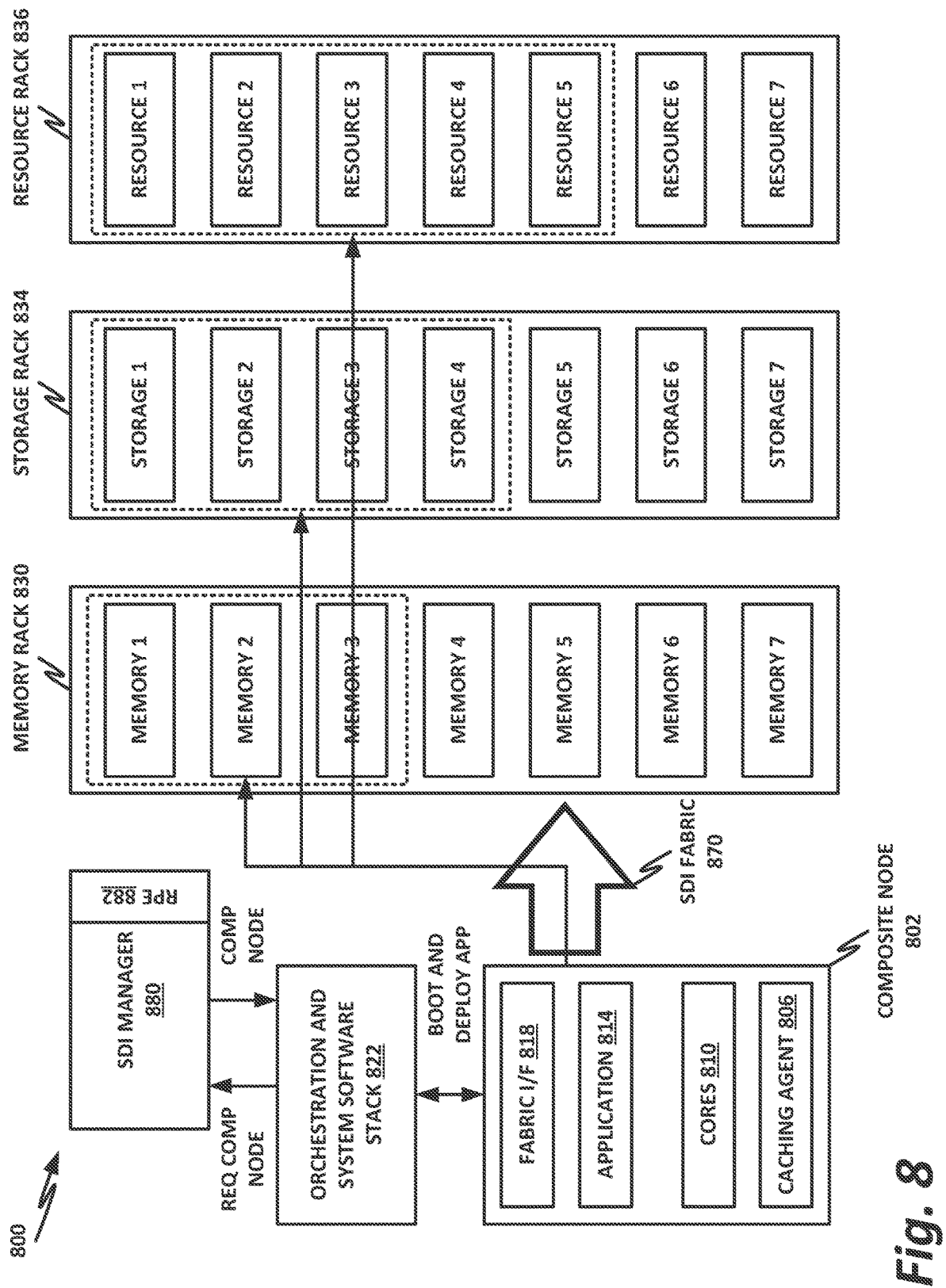
FIG. 8 is a block diagram of a software defined infrastructure (SDI) data center, according to one or more examples of the present specification.

FIG. 8 is a block diagram of a software defined infrastructure (SDI) data center 800, according to one or more examples of the present specification. Embodiments of SDI data center 800 disclosed herein may be adapted or configured to provide the method of scalable edge computing according to the teachings of the present specification.

Certain applications hosted within SDI data center 800 may employ a set of resources to achieve their designated purposes, such as processing database queries, serving web pages, or providing computer intelligence.

Certain applications tend to be sensitive to a particular subset of resources. For example, SAP HANA is an in-memory, column-oriented relational database system. A SAP HANA database may use processors, memory, disk, and fabric, while being most sensitive to memory and processors. In one embodiment, composite node 802 includes one or more cores 810 that perform the processing function. Node 802 may also include caching agents 806 that provide access to high-speed cache. One or more applications 814 run on node 802, and communicate with the SDI fabric via HFI 818. Dynamically provisioning resources to node 802 may include selecting a set of resources and ensuring that the quantities and qualities provided meet required performance indicators, such as SLAs and QoS. Resource selection and allocation for application 814 may be performed by a resource manager, which may be implemented within orchestration and system software stack 822. By way of nonlimiting example, throughout this specification the resource manager may be treated as though it can be implemented separately or by an orchestrator. Note that many different configurations are possible.

In an SDI data center, applications may be executed by a composite node such as node 802 that is dynamically allocated by SDI manager 880. Such nodes are referred to as composite nodes because they are not nodes where all of the resources are necessarily collocated. Rather, they may include resources that are distributed in different parts of the data center, dynamically allocated, and virtualized to the specific application 814.

In this example, memory resources from three memory sleds from memory rack 830 are allocated to node 802, storage resources from four storage sleds from storage rack 834 are allocated, and additional resources from five resource sleds from resource rack 836 are allocated to application 814 running on composite node 802. All of these resources may be associated to a particular compute sled and aggregated to create the composite node. Once the composite node is created, the operating system may be booted in node 802, and the application may start running using the aggregated resources as if they were physically collocated resources. As described above, HFI 818 may provide certain interfaces that enable this operation to occur seamlessly with respect to node 802.

As a general proposition, the more memory and compute resources that are added to a database processor, the better throughput it can achieve. However, this is not necessarily true for the disk or fabric. Adding more disk and fabric bandwidth may not necessarily increase the performance of the SAP HANA database beyond a certain threshold.

SDI data center 800 may address the scaling of resources by mapping an appropriate amount of offboard resources to the application based on application requirements provided by a user or network administrator or directly by the application itself. This may include allocating resources from various resource racks, such as memory rack 830, storage rack 834, and resource rack 836.

In an example, SDI controller 880 also includes a resource protection engine (RPE) 882, which is configured to assign permission for various target resources to disaggregated compute resources (DRCs) that are permitted to access them. In this example, the resources are expected to be enforced by an HFI servicing the target resource.

In certain embodiments, elements of SDI data center 800 may be adapted or configured to operate with the disaggregated telemetry model of the present specification.

Figure 9:
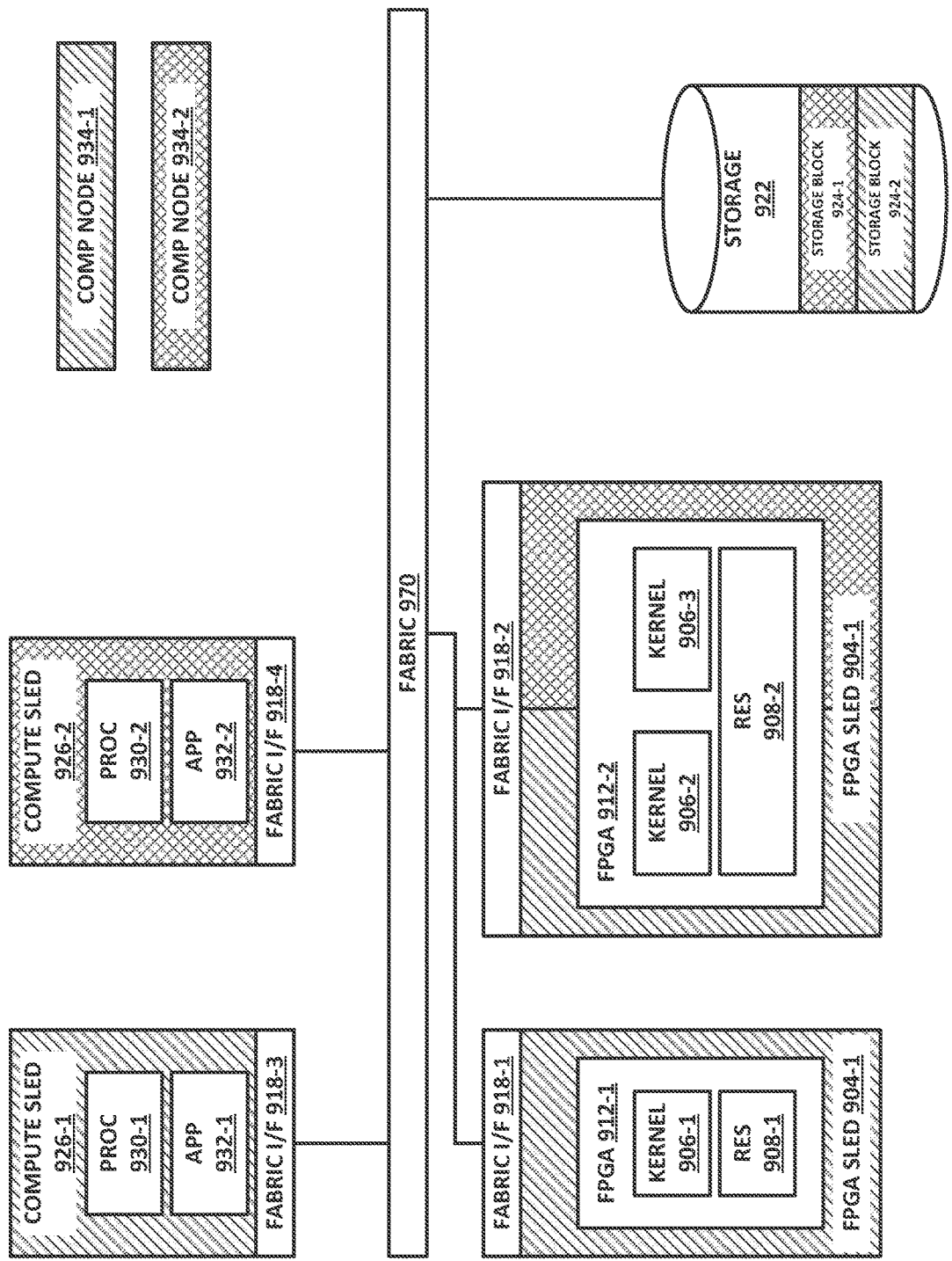
FIG. 9 is a block diagram of a data center, according to one or more examples of the present specification.

FIG. 9 is a block diagram of a data center 900, according to one or more examples of the present specification. Embodiments of data center 900 disclosed herein may be adapted or configured to provide the method of scalable edge computing according to the teachings of the present specification.

In the example of FIG. 9, two composite nodes, namely composite node 934-1 and composite node 934-2 are defined.

Data center 900 includes a number of resources that may be disaggregated and that may be defined as part of a composite node according to the teachings of the present specification. For example, compute sleds 926-1 and 926-2 each include a processor, respectively 930-1 and 930-2. Each processor 930 may host a respective application, 932-1 and 932-2.

Note that in various embodiments, compute sleds 926-1 may also provide local memory, storage, accelerators, or other resources for processor 930-1. However, in accordance with the SDI teachings of the present specification, certain resources assigned to composite nodes 934 may also be disaggregated, or physically remote from processors 930. In this example, each composite node 934 has assigned to it one or more FPGAs 912 residing in FPGA sleds 904. These FPGAs may provide an accelerated function operating at near hardware speeds, and provided by a kernel 906. Each FPGA 912 may also have access to certain local FPGA resources 908. Composite node 934 may also have access to storage blocks 924 within storage sled 922. Storage 922 may also be a disaggregated resource provided in a resource sled.

It should be noted that, for simplicity and clarity of the illustration, only selected components are disclosed in this illustration. However, other disaggregated resources may also be provided. For example, data center 900 may include a memory server providing disaggregated memory, including persistent fast memory, which composite nodes 934 may access via remote direct memory access (RDMA).

In this example, composite node 934-1 includes processor 930-1 on compute sled 926-1, running application 932-1, and accessing fabric 970 via HFI 918-3. Composite node 934-1 also includes FPGA 912-1 running on FPGA sled 904-1, running FPGA kernel 906-1, and having access to FPGA resources 908-1. FPGA sled 904-1 may access fabric 970 via HFI 918-1. Note that in this example, a plurality of FPGAs on FPGA sled 904-1 may be connected to one another via a passive backplane, and a single HFI 918-1 may be provided for the entire sled. Composite node 934-1 may also have access to storage block 924-1 on storage sled 922. Within FPGA sled 904-2, FPGA 912-2 has access to a shared resource 908-2, which is accessed by two different kernels, kernel 906-2 and kernel 906-3. Kernel 906-2 on FPGA 912-1 is also assigned to composite node 934-1, while kernel 906-3 is not.

Composite node 934-2 includes processor 930-2 running application 932-2 on compute sled 926-2. Compute sled 926-2 connects to fabric 970 via HFI 918-4. Note that compute sleds 926 may also include a number of processors, memory, and other local resources that may be communicatively coupled to one another via a passive backplane, and share a common HFI 918. Composite node 934-2 also includes kernel 906-3 running on shared FPGA 912-2, and having access to shared resource 908-2. Composite node 934-2 may store data on storage block 924-2.

Figure 10:
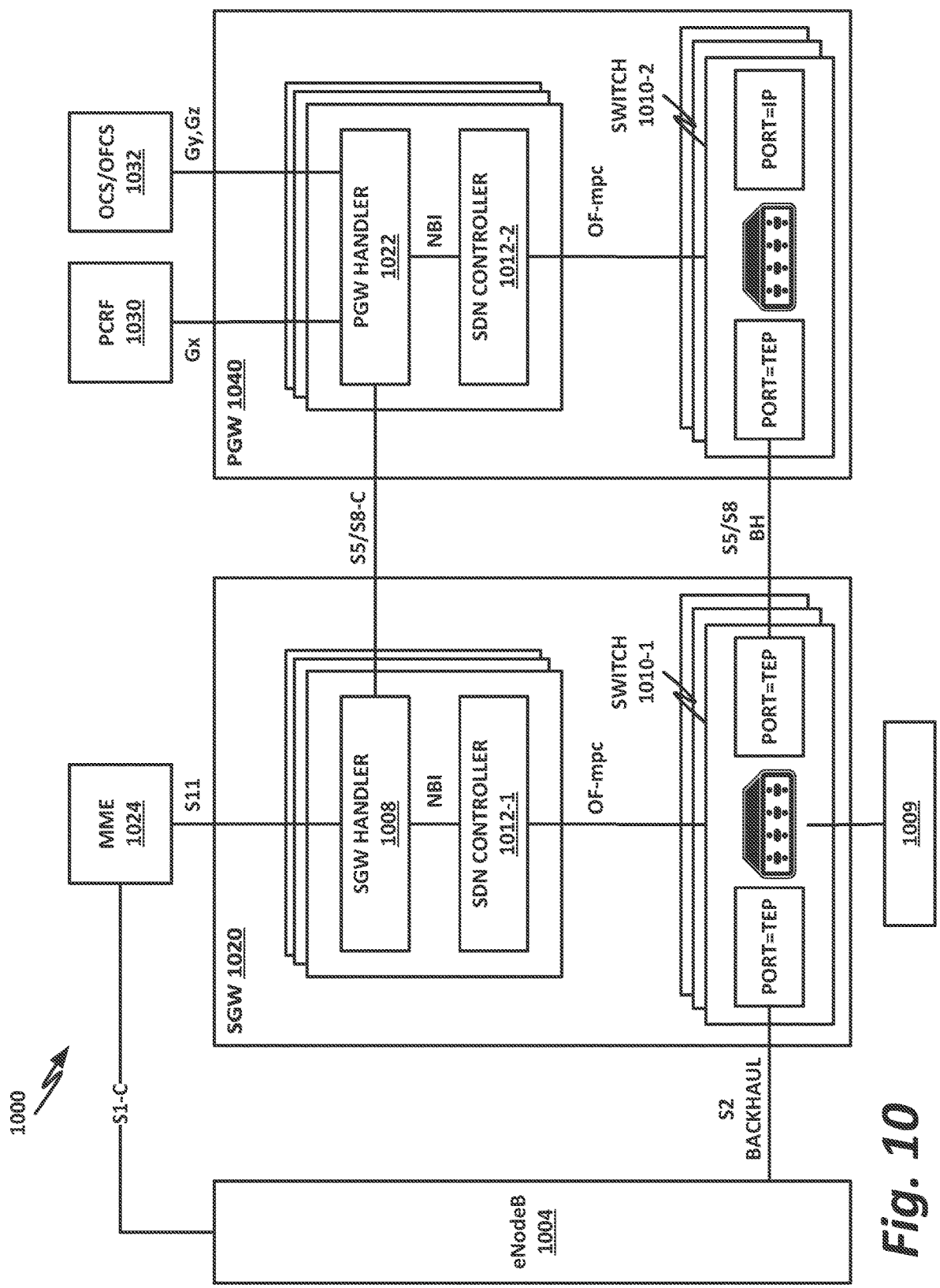
FIG. 10 is a block diagram of a mobile data network, according to one or more examples of the present specification.

FIG. 10 is a block diagram of a mobile data network 1000, according to one or more examples of the present specification. Embodiments of mobile data network 1000 disclosed herein may be adapted or configured to provide the method of scalable edge computing according to the teachings of the present specification.

Mobile data network 1000 of FIG. 10 may be provided in some examples with the ability to perform traffic offloading such as for MEC.

Current European Telecommunication Standards Institute (ETSI) practice assumes that the MEC platform supports flexible offloading policies. In some existing 3GPP approaches, such as local IP access/selected IP traffic offload (LIPA/SIPTO), the network may rely solely on the local gateway (LGW) to conduct the offloading based on packet data network (PDN) connectivity identified with the access point name (APN). The more sophisticated control on the user plane such as quality QoS provisioning may be unable to support this offloading because of the rigid PDN connectivity management conducted in the existing 3GPP network infrastructure.

A software defined network (SDN)-based solution as illustrated in FIG. 1000 provides flexibility in user plane processing of the mobile network. For example, currently the Wireless and Mobile Working Group of the Open Networking Foundation (ONF) provides for a centralized EPC platform built with an SDN-based serving gateway (SGW) 1020 and PDN gateway (PGW) 1040, as illustrated in FIG. 10. In network 1000, SGW 1020 is communicatively coupled to eNodeB 1004 via mobility management entity (MME) 1024, via the S11 and S1-C interfaces. SGW 1020 also includes an S2 backhaul interface to eNodeB 1004. SGW 1020 may include one or more SGW handler instances 1008, which interface with an SDN controller 1012-1. SDN controller 1012-1 provides connectivity to a switch 1010-1, which may be, for example, an Open vSwitch. Switch 1010 may switch traffic according to a tunneling endpoint (TEP) and may switch traffic to PGW 1040. PGW 1040 includes one or more instances of a PGW handler 1022, also provided with an SDN controller 1012-2 and a switch 1010-2, which again may be an Open vSwitch. Switch 1010-2 receives traffic according to a tunneling endpoint, and switches traffic out according, for example, to an IP address. Note that PGW handler 1022 communicatively couples to SGW handler 1008 via the S5 and S8-C interfaces, while switch 1010-2 includes S5 and S8 backhaul interfaces. As illustrated in FIG. 5, PGW 1040 may also communicatively couple to policy and charging rules function (PCRF) 1030 and online charging system/offline charging system (OCS/OFCS) 1032.

In the LIPA/SIPTO approach of 3GPP, a terminal may be connected via a small base station to access IP-capable entities in the same residential or enterprise IP network without the user plane traversing the mobile operator's network. This may be achieved with the LIPA/SIPTO PDN connection established by the terminal request based on the APN. The terminal and the base station may be updated to support the signaling for the LIPA/SIPTO connection establishment.

In an embodiment, when encapsulated traffic arrives on switch 1010-1 via S1 backhaul, switch 1010-1 consults its OpenFlow rules, which indicate that the traffic is to be send to SGW handler 1008, which includes an SDN controller 1012-1. SGW handler 1008 may then direct the traffic to PGW 1040 via the S5 or S8 interface.

However, in embodiments that support MEC, a local server 1009 may be provided, and may be configured to provide MEC services. Thus, switch 1010-1 may need to have logic for determining that the traffic belongs to a class of traffic for offloading to local server 1009. However, some existing embodiments of an SGW 1020 support traffic offloading based only on fields contained in the packet header itself, such as source IP or destination IP. They may lack support for offloading traffic based on user plane data, such as APN or bearer ID, which are not available in encapsulated user plane packets. Thus, embodiments of the present specification introduce a RAN UPPE, as illustrated in more detail in FIG. 9, which is capable of converting a matching field not contained in the processed packet into a matching field inside the processed packet.

Network edge virtualization software development kit (NEV-SDK, for example, as provided by Intel® Corporation) in some embodiments enables user plane traffic processing at the network edge in which the MEC application is supported.

Figure 11:
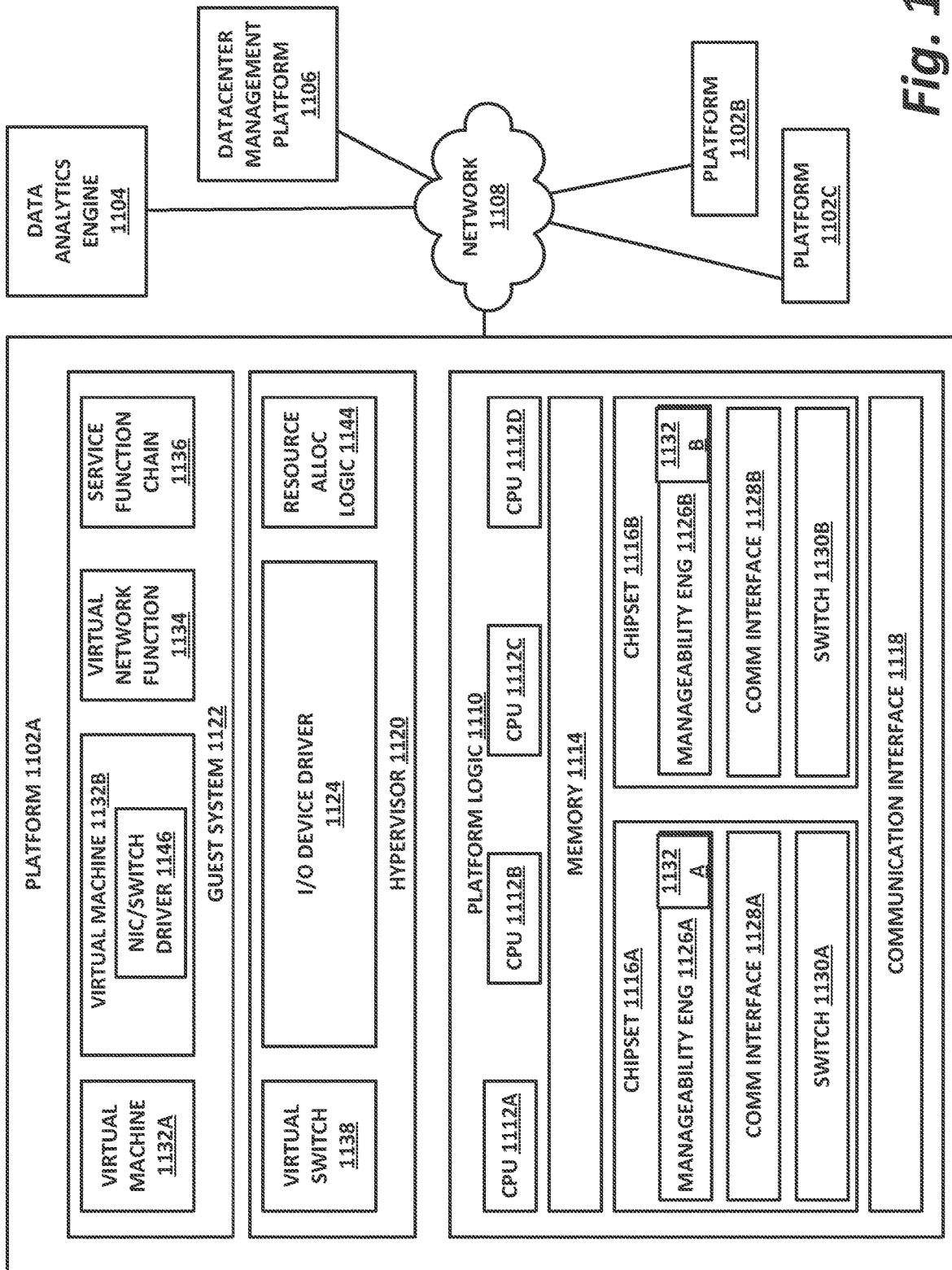
FIG. 11 is a block diagram of components of a computing platform, according to one or more examples of the present specification.

FIG. 11 is a block diagram of components of a computing platform 1102A, according to one or more examples of the present specification. Embodiments of computing platform 1102A disclosed herein may be adapted or configured to provide the method of scalable edge computing according to the teachings of the present specification.

In the embodiment depicted, hardware platforms 1102A, 1102B, and 1102C, along with a data center management platform 1106 and data analytics engine 1104 are interconnected via network 1108. In other embodiments, a computer system may include any suitable number of (i.e., one or more) platforms, including hardware, software, firmware, and other components. In some embodiments (e.g., when a computer system only includes a single platform), all or a portion of the system management platform 1106 may be included on a platform 1102. A platform 1102 may include platform logic 1110 with one or more CPUs 1112, memories 1114 (which may include any number of different modules), chipsets 1116, communication interfaces 1118, and any other suitable hardware and/or software to execute a hypervisor 1120 or other operating system capable of executing workloads associated with applications running on platform 1102. In some embodiments, a platform 1102 may function as a host platform for one or more guest systems 1122 that invoke these applications. Platform 1102A may represent any suitable computing environment, such as a high performance computing environment, a data center, a communications service provider infrastructure (e.g., one or more portions of an EPC), an in-memory computing environment, a computing system of a vehicle (e.g., an automobile or airplane), an Internet of things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 1106, hypervisor 1120, or other operating system) of computer platform 1102A may assign hardware resources of platform logic 1110 to perform workloads in accordance with the stress information. In some embodiments, self-diagnostic capabilities may be combined with the stress monitoring to more accurately determine the health of the hardware resources. Each platform 1102 may include platform logic 1110. Platform logic 1110 comprises, among other logic enabling the functionality of platform 1102, one or more CPUs 1112, memory 1114, one or more chipsets 1116, and communication interfaces 1128. Although three platforms are illustrated, computer platform 1102A may be interconnected with any suitable number of platforms. In various embodiments, a platform 1102 may reside on a circuit board that is installed in a chassis, rack, or other suitable structure that comprises multiple platforms coupled together through network 1108 (which may comprise, e.g., a rack or backplane switch).

CPUs 1112 may each comprise any suitable number of processor cores and supporting logic (e.g., uncores). The cores may be coupled to each other, to memory 1114, to at least one chipset 1116, and/or to a communication interface 1118, through one or more controllers residing on CPU 1112 and/or chipset 1116. In particular embodiments, a CPU 1112 is embodied within a socket that is permanently or removably coupled to platform 1102A. Although four CPUs are shown, a platform 1102 may include any suitable number of CPUs.

Memory 1114 may comprise any form of volatile or nonvolatile memory including, without limitation, magnetic media (e.g., one or more tape drives), optical media, random access memory (RAM), read-only memory (ROM), flash memory, removable media, or any other suitable local or remote memory component or components. Memory 1114 may be used for short, medium, and/or long-term storage by platform 1102A. Memory 1114 may store any suitable data or information utilized by platform logic 1110, including software embedded in a computer-readable medium, and/or encoded logic incorporated in hardware or otherwise stored (e.g., firmware). Memory 1114 may store data that is used by cores of CPUs 1112. In some embodiments, memory 1114 may also comprise storage for instructions that may be executed by the cores of CPUs 1112 or other processing elements (e.g., logic resident on chipsets 1116) to provide functionality associated with the manageability engine 1126 or other components of platform logic 1110. A platform 1102 may also include one or more chipsets 1116 comprising any suitable logic to support the operation of the CPUs 1112. In various embodiments, chipset 1116 may reside on the same die or package as a CPU 1112 or on one or more different dies or packages. Each chipset may support any suitable number of CPUs 1112. A chipset 1116 may also include one or more controllers to couple other components of platform logic 1110 (e.g., communication interface 1118 or memory 1114) to one or more CPUs. In the embodiment depicted, each chipset 1116 also includes a manageability engine 1126. Manageability engine 1126 may include any suitable logic to support the operation of chipset 1116. In a particular embodiment, a manageability engine 1126 (which may also be referred to as an innovation engine) is capable of collecting real-time telemetry data from the chipset 1116, the CPU(s) 1112 and/or memory 1114 managed by the chipset 1116, other components of platform logic 1110, and/or various connections between components of platform logic 1110. In various embodiments, the telemetry data collected includes the stress information described herein.

In various embodiments, a manageability engine 1126 operates as an out-of-band asynchronous compute agent which is capable of interfacing with the various elements of platform logic 1110 to collect telemetry data with no or minimal disruption to running processes on CPUs 1112. For example, manageability engine 1126 may comprise a dedicated processing element (e.g., a processor, controller, or other logic) on chipset 1116, which provides the functionality of manageability engine 1126 (e.g., by executing software instructions), thus conserving processing cycles of CPUs 1112 for operations associated with the workloads performed by the platform logic 1110. Moreover the dedicated logic for the manageability engine 1126 may operate asynchronously with respect to the CPUs 1112 and may gather at least some of the telemetry data without increasing the load on the CPUs.

A manageability engine 1126 may process telemetry data it collects (specific examples of the processing of stress information are provided herein). In various embodiments, manageability engine 1126 reports the data it collects and/or the results of its processing to other elements in the computer system, such as one or more hypervisors 1120 or other operating systems and/or system management software (which may run on any suitable logic such as system management platform 1106). In particular embodiments, a critical event such as a core that has accumulated an excessive amount of stress may be reported prior to the normal interval for reporting telemetry data (e.g., a notification may be sent immediately upon detection).

Additionally, manageability engine 1126 may include programmable code configurable to set which CPU(s) 1112 a particular chipset 1116 manages and/or which telemetry data may be collected.

Chipsets 1116 also each include a communication interface 1128. Communication interface 1128 may be used for the communication of signaling and/or data between chipset 1116 and one or more I/O devices, one or more networks 1108, and/or one or more devices coupled to network 1108 (e.g., system management platform 1106). For example, communication interface 1128 may be used to send and receive network traffic such as data packets. In a particular embodiment, a communication interface 1128 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 1116 (e.g., manageability engine 1126 or switch 1130) and another device coupled to network 1108. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 1128 may allow communication of data (e.g., between the manageability engine 1126 and the data center management platform 1106) associated with management and monitoring functions performed by manageability engine 1126. In various embodiments, manageability engine 1126 may utilize elements (e.g., one or more NICs) of communication interfaces 1128 to report the telemetry data (e.g., to system management platform 1106) in order to reserve usage of NICs of communication interface 1118 for operations associated with workloads performed by platform logic 1110.

Switches 1130 may couple to various ports (e.g., provided by NICs) of communication interface 1128 and may switch data between these ports and various components of chipset 1116 (e.g., one or more Peripheral Component Interconnect Express (PCIe) lanes coupled to CPUs 1112). Switches 1130 may be a physical or virtual (i.e., software) switch.

Platform logic 1110 may include an additional communication interface 1118. Similar to communication interfaces 1128, communication interfaces 1118 may be used for the communication of signaling and/or data between platform logic 1110 and one or more networks 1108 and one or more devices coupled to the network 1108. For example, communication interface 1118 may be used to send and receive network traffic such as data packets. In a particular embodiment, communication interfaces 1118 comprise one or more physical NICs. These NICs may enable communication between any suitable element of platform logic 1110 (e.g., CPUs 1112 or memory 1114) and another device coupled to network 1108 (e.g., elements of other platforms or remote computing devices coupled to network 1108 through one or more networks).

Platform logic 1110 may receive and perform any suitable types of workloads. A workload may include any request to utilize one or more resources of platform logic 1110, such as one or more cores or associated logic. For example, a workload may comprise a request to instantiate a software component, such as an I/O device driver 1124 or guest system 1122; a request to process a network packet received from a virtual machine 1132 or device external to platform 1102A (such as a network node coupled to network 1108); a request to execute a process or thread associated with a guest system 1122, an application running on platform 1102A, a hypervisor 1120 or other operating system running on platform 1102A; or other suitable processing request.

A virtual machine 1132 may emulate a computer system with its own dedicated hardware. A virtual machine 1132 may run a guest operating system on top of the hypervisor 1120. The components of platform logic 1110 (e.g., CPUs 1112, memory 1114, chipset 1116, and communication interface 1118) may be virtualized such that it appears to the guest operating system that the virtual machine 1132 has its own dedicated components.

A virtual machine 1132 may include a virtualized NIC (vNIC), which is used by the virtual machine as its network interface. A vNIC may be assigned a media access control (MAC) address or other identifier, thus allowing multiple virtual machines 1132 to be individually addressable in a network.

VNF 1134 may comprise a software implementation of a functional building block with defined interfaces and behavior that can be deployed in a virtualized infrastructure. In particular embodiments, a VNF 1134 may include one or more virtual machines 1132 that collectively provide specific functionalities (e.g., wide area network (WAN) optimization, virtual private network (VPN) termination, firewall operations, load balancing operations, security functions, etc.). A VNF 1134 running on platform logic 1110 may provide the same functionality as traditional network components implemented through dedicated hardware. For example, a VNF 1134 may include components to perform any suitable NFV workloads, such as virtualized evolved packet core (vEPC) components, mobility management entities, 3rd Generation Partnership Project (3GPP) control and data plane components, etc.

SFC 1136 is a group of VNFs 1134 organized as a chain to perform a series of operations, such as network packet processing operations. Service function chaining may provide the ability to define an ordered list of network services (e.g. firewalls, load balancers) that are stitched together in the network to create a service chain.

A hypervisor 1120 (also known as a virtual machine monitor) may comprise logic to create and run guest systems 1122. The hypervisor 1120 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 1110. Services of hypervisor 1120 may be provided by virtualizing in software or through hardware assisted resources that require minimal software intervention, or both. Multiple instances of a variety of guest operating systems may be managed by the hypervisor 1120. Each platform 1102 may have a separate instantiation of a hypervisor 1120.

Hypervisor 1120 may be a native or bare metal hypervisor that runs directly on platform logic 1110 to control the platform logic and manage the guest operating systems. Alternatively, hypervisor 1120 may be a hosted hypervisor that runs on a host operating system and abstracts the guest operating systems from the host operating system. Hypervisor 1120 may include a virtual switch 1138 that may provide virtual switching and/or routing functions to virtual machines of guest systems 1122. The virtual switch 1138 may comprise a logical switching fabric that couples the vNICs of the virtual machines 1132 to each other, thus creating a virtual network through which virtual machines may communicate with each other.

Virtual switch 1138 may comprise a software element that is executed using components of platform logic 1110. In various embodiments, hypervisor 1120 may be in communication with any suitable entity (e.g., a SDN controller) which may cause hypervisor 1120 to reconfigure the parameters of virtual switch 1138 in response to changing conditions in platform 1102 (e.g., the addition or deletion of virtual machines 1132 or identification of optimizations that may be made to enhance performance of the platform).

Hypervisor 1120 may also include resource allocation logic 1144, which may include logic for determining allocation of platform resources based on the telemetry data (which may include stress information). Resource allocation logic 1144 may also include logic for communicating with various components of platform logic 1110 entities of platform 1102A to implement such optimization, such as components of platform logic 1110.

Any suitable logic may make one or more of these optimization decisions. For example, system management platform 1106; resource allocation logic 1144 of hypervisor 1120 or other operating system; or other logic of computer platform 1102A may be capable of making such decisions. In various embodiments, the system management platform 1106 may receive telemetry data from and manage workload placement across multiple platforms 1102. The system management platform 1106 may communicate with hypervisors 1120 (e.g., in an out-of-band manner) or other operating systems of the various platforms 1102 to implement workload placements directed by the system management platform.

The elements of platform logic 1110 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a GTL bus.

Elements of the computer platform 1102A may be coupled together in any suitable manner such as through one or more networks 1108. A network 1108 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 12:
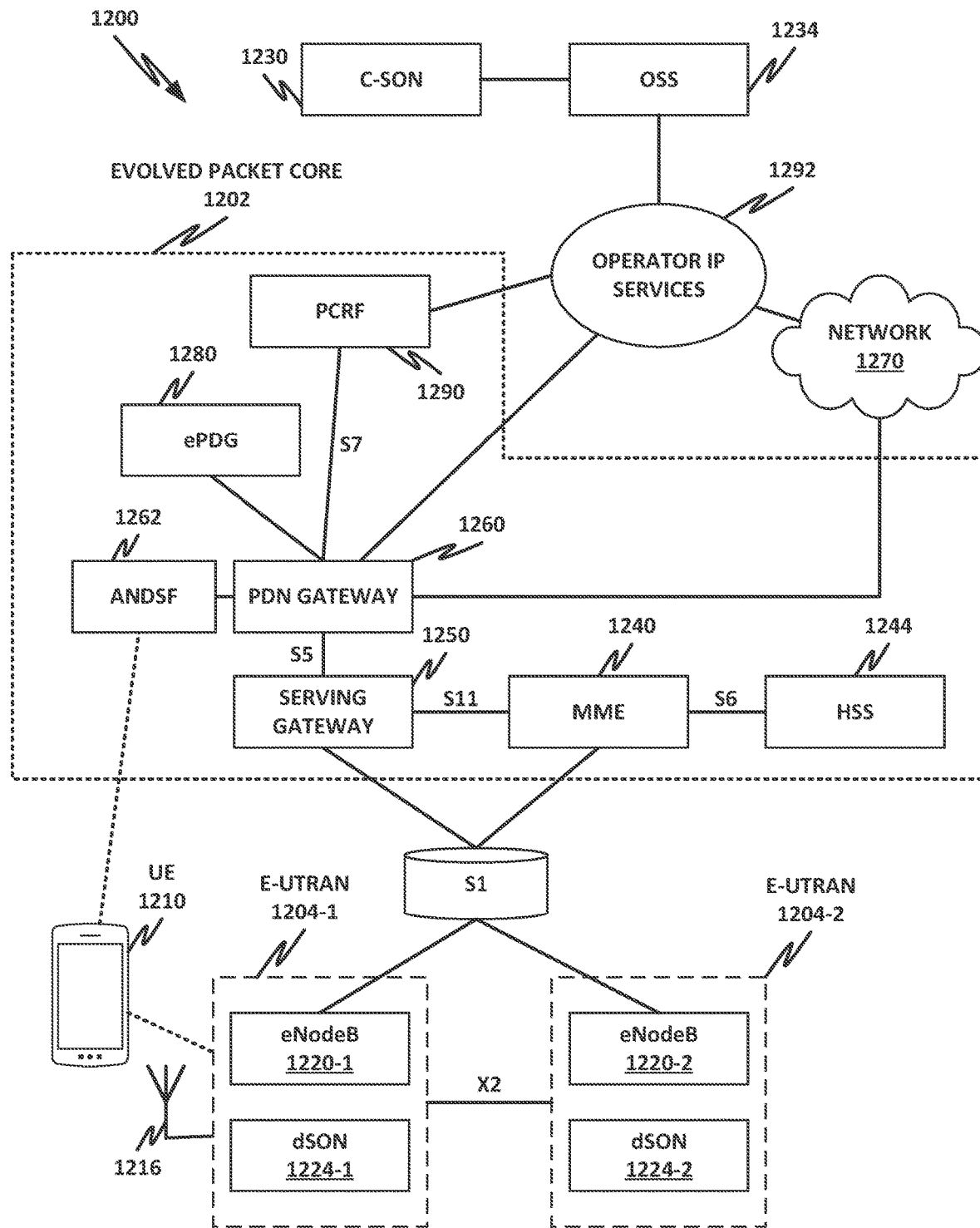
FIG. 12 is a block diagram of a mobile network, according to one or more examples of the present specification.

FIG. 12 is a block diagram of a mobile network 1200, according to one or more examples of the present specification. Embodiments of mobile network 1200 disclosed herein may be adapted or configured to provide the method of scalable edge computing according to the teachings of the present specification.

In this specific example, a fourth-generation long-term evolution (4G LTE, or simply LTE) network is disclosed by way of nonlimiting example. In certain embodiments, LTE is used primarily for data transfer, so that mobile network 1200 may also provide, in addition to the elements shown here, structure for handling voice communication, which may communicatively couple to a public-switched telephone network (PSTN). In some cases, voice over LTE (VoLTE) may also be provided. It should also be noted that LTE is disclosed only as one possible embodiment of the teachings of this specification, and that the teachings may be relevant to other telecommunication structures now in existence or later developed, and the scope of this specification is intended to encompass such structures where applicable.

In this example, mobile network 1200 includes UE 1210 communicatively coupled, for example via a wireless antenna 1216, to an evolved universal mobile telecommunications system (UMTS) radio access network (E-UTRAN) 1204. UE 1210 may initiate a data transaction or session with E-UTRAN 1204-1, referred to herein as a "data call." E-UTRAN 1204 communicatively couples to an EPC 1202, for example via wired connections. E-UTRAN 1204 may include, by way of nonlimiting example, an evolved NodeB (eNB) 1220, which acts as a wireless base station, and a distributed self-organizing network (dSON) controller 1224.

In various embodiments, these functions may be provided by dedicated servers or appliances. In other embodiments, select functions may be provided in virtual environments, such as a rackmounted server providing various functions in a hypervisor. In a general sense, the various UE-class devices, server-class devices, network functions, may be generally classified as "computing devices." As used throughout this specification, a computing device includes any electrical or electronic device based on the Von Neumann architecture, including a processor with a control unit and logic unit, and a memory. In that context, it should be understood that the Von Neumann architecture may be provided either as a physical device, or as a virtual machine or hypervisor running at one or more layers of abstraction from the physical hardware.

In this example, two E-UTRANS 1204-1 and 1204-2 are disclosed to illustrate the mobile nature of the network. UE 1210 may move, for example, as a user carrying UE 1210 moves. As UE 1210 moves farther away from E-UTRAN 1204-1, its signal to E-UTRAN 1204 attenuates. If UE 1210 simultaneously moves closer to E-UTRAN 1204-2, its signal with E-UTRAN 1204-2 becomes stronger. When UE 1210 has moved such that it gets a stronger signal to E-UTRAN 1204-2 than to E-UTRAN 1204-1, E-UTRAN 1204-1 may hand off the data call to E-UTRAN 1204-2, so that E-UTRAN 1204-2 seamlessly continues handling the data call.

Handoff may be handled over the X2 interface. In this example, two classes of signals are passed within mobile network 1200: voice, data, and call signals (referred to herein as the "user plane" signals) and control signals (referred to herein as the "control plane" signals). X2 provides both a control plane interface and a user plane interface, and in an embodiment is a wired connection between the two E-UTRANs 1204. The protocol structure of the S1 control plane is based on stream control transmission protocol/Internet protocol (SCTP/IP). The user plane provides a protocol structure based on general packet radio service (GPRS) tunneling protocol/user datagram protocol/IP (GTP/UDP5/IP). On the user plane, a transport bearer may be identified by an IP address and one or more GTP tunneling endpoint IDs (TEID). X2 operates as a meshed interface, meaning that a plurality of eNBs 1220 may all be linked together. Properly configured, X2 helps to minimize packet loss as UE 1210 hands off from one E-UTRAN 1204 to another. Specifically, when the data call is handed off, unsent or unacknowledged packets stored in the old eNB 1220's queues can be forwarded or tunneled to the new eNB 1220 via the X2 interface.

E-UTRANs 1204 communicatively couple to an EPC 1202 via an S1 interface. As with the X2 interface, S1 provides both a control plane and a user plane, configured similarly to the respective X2 control plane and user plane. In an embodiment, the S1 application protocol (S1-AP) is mapped directly on top of SCTP.

In this example, EPC 1202 includes a serving gateway (SGW) 1250, a mobility management entity (MME) 1240, a home subscriber server (HSS) 1244, a PDN gateway 1260, an evolved packet data gateway (ePDG) 1280, and policy and charging rules function (PCRF) 1290. EPC 1202 for its part may communicatively couple, via appropriate interfaces, to a public network such as Internet 1270, or to operator IP services 1292.

When UE 1210 is performing data operations, such as web applications, web surfing, e-mail, or other network operations, UE 1220 connects to Internet 1270 via mobile network 1200. In one example scenario, user plane signals originate from UE 1210 and are passed to E-UTRAN 1204. Within E-UTRANs 1204, user plane signals are first received by eNB 1220 (or other similar base station), which interfaces with EPC 1202 to handle the data call.

As a wireless local area network (WLAN) access point (WAP), eNB 1220 supports Layer 1 and Layer 2 of the E-UTRAN orthogonal frequency division multiplexing (OFDM) physical interface. Advantageously, eNBs 1220 may directly connect to a network router, thus simplifying network architecture. Further, eNB 1220 may support certain legacy features related to physical layer procedures for transmitting and receiving, including modulation and demodulation, and channel encoding and decoding. Additionally, eNB 1220 may also provide radio resource control and radio mobility management for processing handovers.

EPC 1202 provides several functional blocks to provide various support functions. These are described herein by way of nonlimiting example only.

MME 1240 provides control functions to EPC 1202. MME 1240 provides idle mode UE paging and tagging procedures, including retransmissions. MME 1240 also provides bearer activation and deactivation support, and may choose an appropriate SGW 1250 for UE 1210 when UE 1210 initially attaches to EPC 1202 via E-UTRAN 1204. After attachment, MME 1240 authenticates UE 1210 via HSS 1244.

Non Access Stratum (NAS) signaling terminates at MME 1240, and MME 1240 is also responsible for generating and allocating a temporary identity for UE 1210. MME 1240 then verifies the authorization of UE 1210 to resources on the service provider's public land mobile network (PLMN), and enforces roaming restrictions on UE 1210. MME 1240 is also a terminal endpoint for ciphering/integrity protection for NAS signaling, and handles security key management. MME 1240 also supports lawful signal interception. MME 1240 also provides control plane functions for mobility between LTE and 2G/3G networks with the S3 interface terminating at MME 1240 from, for example, a 3G serving GPRS support node (SGSN). Finally, MME 1240 terminates the Sha interface of HSS 1244 for roaming UEs.

HSS 1244 is, in an embodiment, a database server to provide home location register (HLR) and authentication center (AuC) services. The functions of the HSS include call and session establishment support, user authentication, and access authorization, by way of nonlimiting example.

In an embodiment, HLR stores and updates a user subscription information database. This may include the following, by way of nonlimiting example:

a. User identification and addressing, including the International Mobile Subscriber Identity (IMSI), Mobile Subscriber Integrated Services Digital Network Number (MSISDN), and/or mobile telephone number.
  b. User profile information, including subscriptions and quality of service (QoS) data.

AuC generates security data from user identity keys, and provides the data to at least the HLR, and as necessary, to other functional blocks.

SGW 1250 forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN gateway 1250). When UE 1210 is idle, SGW 1250 terminates the downlink data path and triggers paging when downlink data arrives for UE 1210. SGW 1250 may also store UE contexts including parameters of the IP bearer service and network internal routing information. It also performs replication of the user traffic in case of lawful interception.

PDN gateway 1260 provides connectivity from UE 1210 to external PDNs and provides both an entry point and exit point for UE traffic. UE 1210 may simultaneously connect to more than one PDN gateway 1250, and thus may access multiple PDNs. In an example, PDN gateway 1250 provides policy enforcement, packet filtering on a per-user basis, charging support, lawful interception, and packet screening, by way of nonlimiting example.

Access Network Discovery and Selection Function (ANDSF) 1262 helps UE 1210 discover non-3GPP access networks, such as Wi-Fi or worldwide interoperability for microwave access (WIMAX), that can be used in addition to the LTE network for data communication. ANDSF 1260 may provide UE 1210 with rules policing the connection to such networks. ANDSF 1260 may provide the following to UE, by way of nonlimiting example:

a. Inter-system mobility policy (ISMP)—network selections rules for when UE 1210 has no more than one active access network connection (e.g., either LTE or Wi-Fi).
  b. Inter-system routing policy (ISRP)—network selection rules for when UE 1210 has potentially more than one active access network connection (e.g., both LTE and Wi-Fi). In this case, UE 1210 may employ IP flow mobility, multiple-access PDN connectivity (MAP-CON), or non-seamless Wi-Fi offload according to policy and user preferences.
  c. Discovery information—a list of networks that may be available in the vicinity of UE 1210, and information to help UE 1210 connect to these networks.

ANDSF 1262 may communicate with the UE 1210 over the S14 reference point, which in some embodiments is specific to ANDSF.

PCRF 1290 provides, in an embodiment, both policy decision functions (PDF) and charging rules functions (CRF).

PDF makes policy decisions. Specifically, when an IP multimedia subsystem (IMS) is set up, session initiation protocol (SIP) data include media requirements, which the terminal and proxy call session control function (P-CSCF) may exchange between themselves. During the session establishment process, the PDF may also receive those requirements from the P-CSCF and make decisions based on network operator rules. These may include, by way of nonlimiting example:

a. Allowing or rejecting a media request.
b. Using new or existing programmed data processor (PDP) context for an incoming media request.
c. Checking allocation of resources against authorized resource usage.

The CRF provides operator-defined charging rules applicable to each service data flow. The CRF selects the relevant charging rules based on information provided by the P-CSCF, such as Application Identifier, Type of Stream (audio, video, etc.), or Application Data Rate, by way of nonlimiting example.

Data transmission is secured by ePDG 1280 with a UE 1210 connected to EPC 1202 over an untrusted, non-3GPP access. For this purpose, the ePDG acts as a termination node of IPsec tunnels established with UE 1210.

Network 1270 may be any suitable network or combination of one or more networks operating on one or more suitable networking protocols, including for example, a local area network, an intranet, a virtual network, a WAN, a wireless network, a cellular network, or the Internet (optionally accessed via a proxy, virtual machine, or other similar security mechanism) by way of nonlimiting example. Network 1270 may also include one or more servers, firewalls, routers, switches, security appliances, antivirus servers, or other useful network devices. In this illustration, network 1270 is shown as a single network for simplicity, but in some embodiments, network 1270 may include a large number of networks, such as one or more enterprise intranets connected to the Internet.

Operator IP services 1292 include services provided by an operator of EPC 1202. Operator IP services 1292 may include, or may communicatively couple to an operations support system (OSS) 1232. OSS 1232 provides hardware and software for monitoring, controlling, analyzing, and managing EPC 1202.

Advantageously, LTE provides for self-organizing networks (SONs) (also sometimes called a self-optimizing network, which is used interchangeably). SON provides automation methods to facilitate planning, configuring, managing, optimizing, and healing a network such as EPC 1202 and E-UTRAN 1204.

SON may be provided in different flavors, including for example centralized SON (C-SON) 1230, distributed SON (dSON) 1224, and in some cases hybrid SON (hSON).

C-SON 1230 provides centralized higher-level network control, with increased coordination between nodes for functions such as load balancing across a wide geographic area. In contrast, dSON 1224 provides a distributed, peer-to-peer control function, in which each E-UTRAN network wirelessly receives reported parameters from other E-UTRANs, and makes autonomous decisions based on those reports. hSON (not shown in this illustration) provides a hybrid solution in which some functions are centralized and others are distributed.

Advantageously, SON provides useful functions such as:
a. Self-Configuration. In a self-configuration network, new base stations are automatically configured and integrated into the network, and new features on a base station are also seamlessly integrated. When a new base station is introduced into the network and powered on, it is immediately recognized and registered by the network. The neighboring base stations then automatically adjust to provide the required coverage and capacity, as well as to avoid the interference.

b. Self-Optimization. Base station such as eNBs 1220 may provide configuration parameters intended to control and/or optimize their behavior. Based on observations of both eNB 1220 itself, and measurements at UE 1210 or elsewhere, a SON may automatically reconfigure these parameters to enhance network efficiency. In another embodiment, SON provides automatic neighbor relations (ANR), and optimizes random access parameters or mobility robustness. In yet another embodiment, SON switches off some number of base stations at night to conserve power. These base stations may be selected to ensure that full coverage is still provided in a coverage area. Neighboring base station may reconfigure appropriate parameters to ensure full coverage and adjust to the changed network topology. If a sudden spike in demand occurs, one or more sleeping base stations may wake up almost instantaneously. This may realize significant power savings without sacrificing network Self-Healing. If a network node (such as an eNB 1220) goes down, self-healing helps to mitigate the effect of the failure on the overall network. For example a SON may adjust parameters and algorithms in adjacent eNBs 1220 so that they can continue to provide service to the failed eNB 1220. This is in contrast to legacy networks, where substantial time and resources may need to be committed to repairs when a base station fails. With self-healing networks, the network may automatically and nearly-instantaneously self-adjust with little or no service interruption.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of nonlimiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of nonlimiting example, an optical drive (e.g., CD/DVD/Blu-Ray), a hard drive, a solid-state drive, a flash memory, or other nonvolatile medium. A computer-readable medium could also include a medium such as a ROM, an FPGA or ASIC configured to carry out the desired instructions, stored instructions for programming an FPGA or ASIC to carry out the desired instructions, an IP block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A non-transitory storage medium herein is expressly intended to include any non-transitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a nonlimiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in an SoC, including a CPU package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a communication apparatus, comprising: a telemetry interface; a management interface; and an edge gateway configured to: identify diverted traffic, wherein the diverted traffic comprises traffic to be serviced by an edge microcloud configured to provide a plurality of services; receive telemetry via the telemetry interface; use the telemetry to anticipate a future per-service demand within the edge microcloud; compute a scale for a resource to meet the future per-service demand; and operate the management interface to instruct the edge microcloud to perform the scale before the future per-service demand occurs.

Example 2 includes the communication apparatus of example 1, wherein the scale is a scale-up.

Example 3 includes the communication apparatus of example 1, wherein the scale is a scale-down.

Example 4 includes the communication apparatus of example 1, wherein the telemetry comprises base station peer-to-peer telemetry.

Example 5 includes the communication apparatus of example 1, wherein the telemetry comprises telemetry from a central office.

Example 6 includes the communication apparatus of example 1, wherein the telemetry comprises user equipment mobility indicia.

Example 7 includes the communication apparatus of example 1, wherein the telemetry comprises bandwidth delivery indicia.

Example 8 includes the communication apparatus of example 1, wherein the telemetry comprises indicia of a change in a number of sensors or devices online.

Example 9 includes the communication apparatus of example 1, wherein computing the scale for the resource comprises applying a regression model.

Example 10 includes the communication apparatus of example 1, wherein computing the scale for the resource comprises applying a machine learning (ML) model.

Example 11 includes the communication apparatus of example 1, wherein computing the scale for the resource comprises computing an average value.

Example 12 includes the communication apparatus of example 1, wherein computing the scale for the resource comprises applying a temporal periodic prediction.

Example 13 includes the communication apparatus of example 1, wherein computing the scale for the resource comprises anticipating a future usage of the resource by a user equipment device.

Example 14 includes an edge gateway, comprising: a hardware platform; a telemetry interface; a management interface; and logic operable on the hardware platform to: identify diverted traffic, wherein the diverted traffic comprises traffic to be serviced by an edge microcloud configured to provide a plurality of services; receive telemetry via the telemetry interface; use the telemetry to anticipate a future per-service demand within the edge microcloud; compute a scale for a resource to meet the future per-service demand; and operate the management interface to instruct the edge microcloud to perform the scale before the future per-service demand occurs.

Example 15 includes the edge gateway of example 14, wherein the scale is a scale-up.

Example 16 includes the edge gateway of example 14, wherein the scale is a scale-down.

Example 17 includes the edge gateway of example 14, wherein the telemetry comprises base station peer-to-peer telemetry.

Example 18 includes the edge gateway of example 14, wherein the telemetry comprises telemetry from a central office.

Example 19 includes the edge gateway of example 14, wherein the telemetry comprises user equipment mobility indicia.

Example 20 includes the edge gateway of example 14, wherein the telemetry comprises bandwidth delivery indicia.

Example 21 includes the edge gateway of example 14, wherein the telemetry comprises indicia of a change in a number of sensors or devices online.

Example 22 includes the edge gateway of example 14, wherein computing the scale for the resource comprises applying a regression model.

Example 23 includes the edge gateway of example 14, wherein computing the scale for the resource comprises applying a machine learning (ML) model.

Example 24 includes the edge gateway of example 14, wherein computing the scale for the resource comprises computing an average value.

Example 25 includes the edge gateway of example 14, wherein computing the scale for the resource comprises applying a temporal periodic prediction.

Example 26 includes the edge gateway of example 14, wherein computing the scale for the resource comprises anticipating a future usage of the resource by a user equipment device.

Example 27 includes the edge gateway of any of examples 14-26, wherein the hardware platform comprises an application-specific integrated circuit (ASIC).

Example 28 includes the edge gateway of any of examples 14-26, wherein the hardware platform comprises a field-programmable gate array (FPGA).

Example 29 includes the edge gateway of any of examples 14-26, wherein the hardware platform comprises an intellectual property (IP) block.

Example 30 includes the edge gateway of any of examples 14-26, wherein the hardware platform comprises a co-processor.

Example 31 includes the edge gateway of any of examples 14-26, wherein the hardware platform comprises a system-on-a-chip (SoC).

Example 32 includes a network interface card comprising the edge gateway of any of examples 14-31.

Example 33 includes a method of providing an edge gateway, comprising: communicatively coupling to a telemetry source via a telemetry interface; communicatively coupling to an edge microcloud configured to provide a plurality of services via a management interface; identifying diverted traffic, wherein the diverted traffic comprises traffic to be serviced by the edge microcloud; receiving telemetry via the telemetry interface; using the telemetry to anticipate a future per-service demand within the edge microcloud; computing a scale for a resource to meet the future per-service demand; and operating the management interface to instruct the edge microcloud to perform the scale before the future per-service demand occurs.

Example 34 includes the method of example 33, wherein the scale is a scale-up.

Example 35 includes the method of example 33, wherein the scale is a scale-down.

Example 36 includes the method of example 33, wherein the telemetry comprises base station peer-to-peer telemetry.

Example 37 includes the method of example 33, wherein the telemetry comprises telemetry from a central office.

Example 38 includes the method of example 33, wherein the telemetry comprises user equipment mobility indicia.

Example 39 includes the method of example 33, wherein the telemetry comprises bandwidth delivery indicia.

Example 40 includes the method of example 33, wherein the telemetry comprises indicia of a change in a number of sensors or devices online.

Example 41 includes the method of example 33, wherein computing the scale for the resource comprises applying a regression model.

Example 42 includes the method of example 33, wherein computing the scale for the resource comprises applying a machine learning (ML) model.

Example 43 includes the method of example 33, wherein computing the scale for the resource comprises computing an average value.

Example 44 includes the method of example 33, wherein computing the scale for the resource comprises applying a temporal periodic prediction.

Example 45 includes the method of example 33, wherein computing the scale for the resource comprises anticipating a future usage of the resource by a user equipment device.

Example 46 includes an apparatus comprising means for performing the method of any of examples 33-45.

Example 47 includes the apparatus of example 46, wherein the means for performing the method comprise a processor and a memory.

Example 48 includes the apparatus of example 47, wherein the memory comprises machine-readable instructions, that when executed cause the apparatus to perform the method of any of examples 33-45.

Example 49 includes the apparatus of any of examples 46-48, wherein the apparatus is a hardware platform.

Example 50 includes the apparatus of example 49, wherein the hardware platform comprises an application-specific integrated circuit (ASIC).

Example 51 includes the apparatus of example 49, wherein the hardware platform comprises a field-programmable gate array (FPGA).

Example 52 includes the apparatus of example 49, wherein the hardware platform comprises an intellectual property (IP) block.

Example 53 includes the apparatus of example 49, wherein the hardware platform comprises a co-processor.

Example 54 includes the apparatus of example 49, wherein the hardware platform comprises a system-on-a-chip (SoC).

Example 55 includes at least one computer-readable medium comprising instructions that, when executed, implement a method or realize an apparatus as illustrated in any of examples 33-54.

Example 56 includes one or more tangible, non-transitory computer-readable mediums having stored thereon instructions to instruct a device to: communicatively couple to a telemetry source via a telemetry interface; communicatively couple to an edge microcloud configured to provide a plurality of services via a management interface; identify diverted traffic, wherein the diverted traffic comprises traffic to be serviced by the edge microcloud; receive telemetry via the telemetry interface; use the telemetry to anticipate a future per-service demand within the edge microcloud; compute a scale for a resource to meet the future per-service demand; and operate the management interface to instruct the edge microcloud to perform the scale before the future per-service demand occurs.

Example 57 includes the one or more tangible, non-transitory computer-readable mediums of example 56, wherein the scale is a scale-up.

Example 58 includes the one or more tangible, non-transitory computer-readable mediums of example 56, wherein the scale is a scale-down.

Example 59 includes the one or more tangible, non-transitory computer-readable mediums of example 56, wherein the telemetry comprises base station peer-to-peer telemetry.

Example 60 includes the one or more tangible, non-transitory computer-readable mediums of example 56, wherein the telemetry comprises telemetry from a central office.

Example 61 includes the one or more tangible, non-transitory computer-readable mediums of example 56, wherein the telemetry comprises user equipment mobility indicia.

Example 62 includes the one or more tangible, non-transitory computer-readable mediums of example 56, wherein the telemetry comprises bandwidth delivery indicia.

Example 63 includes the one or more tangible, non-transitory computer-readable mediums of example 56, wherein the telemetry comprises indicia of a change in a number of sensors or devices online.

Example 64 includes the one or more tangible, non-transitory computer-readable mediums of example 56, wherein computing the scale for the resource comprises applying a regression model.

Example 65 includes the one or more tangible, non-transitory computer-readable mediums of example 56, wherein computing the scale for the resource comprises applying a machine learning (ML) model.

Example 66 includes the one or more tangible, non-transitory computer-readable mediums of example 56, wherein computing the scale for the resource comprises computing an average value.

Example 67 includes the one or more tangible, non-transitory computer-readable mediums of example 56, wherein computing the scale for the resource comprises applying a temporal periodic prediction.

Example 68 includes the one or more tangible, non-transitory computer-readable mediums of example 56, wherein computing the scale for the resource comprises anticipating a future usage of the resource by a user equipment device.

What is claimed is:

1. A communication apparatus, comprising:
   interface circuitry providing a network interface, a telemetry interface, and a management interface; and
   one or more tangible, non-transitory computer-readable mediums having stored thereon instructions to:
   receive diverted traffic, wherein the diverted traffic comprises traffic diverted from a cloud service provided by a cloud and to be serviced by an edge microcloud configured to provide a plurality of services;
   receive telemetry via the network interface, the telemetry anticipating workload;
   use the telemetry to anticipate a future per-service demand within the edge microcloud;
   determine an adjustment for a resource to meet the future per-service demand; and
   operate the management interface to instruct the edge microcloud to perform a scale operation before the future per-service demand occurs.

2. The communication apparatus of claim 1, wherein the scale operation is a scale-up.

3. The communication apparatus of claim 1, wherein the scale operation is a scale-down.

4. The communication apparatus of claim 1, wherein the telemetry comprises base station peer-to-peer telemetry.

5. The communication apparatus of claim 1, wherein the telemetry comprises telemetry from a central office.

6. The communication apparatus of claim 1, wherein the telemetry comprises user equipment mobility indicia.

7. The communication apparatus of claim 1, wherein the telemetry comprises bandwidth delivery indicia.

8. The communication apparatus of claim 1, wherein the telemetry comprises indicia of a change in a number of sensors or devices online.

9. The communication apparatus of claim 1, wherein computing the adjustment for the resource comprises applying a regression model.

10. The communication apparatus of claim 1, wherein computing the adjustment for the resource comprises applying a machine learning (ML) model.

11. The communication apparatus of claim 1, wherein computing the adjustment for the resource comprises computing an average value.

12. The communication apparatus of claim 1, wherein computing the adjustment for the resource comprises applying a temporal periodic prediction.

13. The communication apparatus of claim 1, wherein computing the adjustment for the resource comprises anticipating a future usage of the resource by a user equipment device.

14. An edge gateway, comprising:
    a hardware platform;
    a telemetry interface;
    a management interface; and
    logic operable on the hardware platform to:
    identify diverted traffic, wherein the diverted traffic comprises traffic diverted from a cloud service provided by a cloud and to be serviced by an edge microcloud configured to provide a plurality of services;
    receive telemetry via the telemetry interface;
    use the telemetry to anticipate a future per-service demand within the edge microcloud;
    compute a scale for a resource to meet the future per-service demand; and
    operate the management interface to instruct the edge microcloud to perform a scale operation before the future per-service demand occurs.

15. The edge gateway of claim 14, wherein the hardware platform comprises an application-specific integrated circuit (ASIC).

16. The edge gateway of claim 14, wherein the hardware platform comprises a field-programmable gate array (FPGA).

17. The edge gateway of claim 14, wherein the hardware platform comprises an intellectual property (IP) block.

18. The edge gateway of claim 14, wherein the hardware platform comprises a co-processor.

19. The edge gateway of claim 14, wherein the hardware platform comprises a system-on-a-chip (SoC).

20. A network interface card comprising the edge gateway of claim 14.

21. A method of providing an edge gateway, comprising:
    communicatively coupling to a telemetry provider via a telemetry interface;
    communicatively coupling to an edge service configured to provide a plurality of services via a management interface;
    identifying diverted traffic, wherein the diverted traffic comprises traffic diverted from a cloud service provided by a cloud and to be serviced by the edge service;
    receiving telemetry via the telemetry interface;
    using the telemetry to anticipate a future per-service demand within the edge service;
    computing a scale for a resource to meet the future per-service demand; and
    operating the management interface to instruct the edge service to perform a scale operation before the future per-service demand occurs.

22. The method of claim 21, wherein the scale is a scale-up.

23. The method of claim 21, wherein the scale is a scale-down.

24. The method of claim 21, wherein the telemetry comprises base station peer-to-peer telemetry.

25. The method of claim 21, wherein the telemetry comprises telemetry from a central office.

* * * * *

UNITED STATES PATENT AND TRADEMARK OFFICE
CERTIFICATE OF CORRECTION

PATENT NO. : 10,944,689 B2
APPLICATION NO. : 16/024465
DATED : March 9, 2021
INVENTOR(S) : Francesc Guim Bernat et al.

Page 1 of 1

It is certified that error appears in the above-identified patent and that said Letters Patent is hereby corrected as shown below:

In the Drawings

On Sheet 6 of 14 (FIG. 4), Line 17, delete "devcies" and insert -- devices --, therefor.

On Sheet 7 of 14 (FIG. 5), Line 10, delete "INTERACE" and insert -- INTERFACE --, therefor.

Signed and Sealed this
First Day of June, 2021

Drew Hirshfeld
*Performing the Functions and Duties of the
Under Secretary of Commerce for Intellectual Property and
Director of the United States Patent and Trademark Office*